US007010665B1

(12) United States Patent
Toll et al.

(10) Patent No.: US 7,010,665 B1
(45) Date of Patent: Mar. 7, 2006

(54) METHOD AND APPARATUS FOR DECOMPRESSING RELATIVE ADDRESSES

(75) Inventors: Bret L. Toll, Tigard, OR (US); Michael J. St. Clair, Portland, OR (US); John Allan Miller, Portland, OR (US); Hitesh Ahuja, Thousand Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 10/185,513

(22) Filed: Jun. 27, 2002

(51) Int. Cl.
*G06F 12/02* (2006.01)

(52) U.S. Cl. ...................................... 711/220; 711/215

(58) Field of Classification Search ................ 711/211, 711/213–215, 1, 200, 220; 712/24, 211
See application file for complete search history.

(56) References Cited

U.S. PATENT DOCUMENTS

| | | | |
|---|---|---|---|
| 5,751,942 A | 5/1998 | Christensen et al. | |
| 5,809,271 A | 9/1998 | Colwell et al. | |
| 6,014,742 A | 1/2000 | Krick et al. | |
| 6,018,786 A | 1/2000 | Krick et al. | |
| 6,073,213 A | 6/2000 | Peled et al. | |
| 6,076,144 A | 6/2000 | Peled et al. | |
| 6,170,038 B1 | 1/2001 | Krick et al. | |
| 6,182,210 B1 | 1/2001 | Akkary et al. | |
| 6,216,206 B1 | 4/2001 | Peled et al. | |
| 6,240,509 B1 | 5/2001 | Akkary | |
| 6,338,132 B1 | 1/2002 | Kyker et al. | |
| 2002/0108029 A1 * | 8/2002 | Kondoh et al. | 712/234 |

OTHER PUBLICATIONS

Glenn Hinton et al, "The Microarchitecture of the Pentium 4 Processor", Intel Technology Journal, Q1, 2001, pp 1-13.*

X86-64™ Technology White Paper AMD, "Advanced Micro Devices, Inc. x86-64™ Technology White Paper", Advanced Micro Devices, Inc., One AMD Place, Sunnyvale, CA 94088, pp. 1-13.

Preliminary Information, "AMD 64-Bit Technology, The AMD x86-64™ Architecture Programmers Overview", AMD, Publication #24108 Rev:C, Issue Date Jan. 2001, 134 pages.

J. Becker et al., "An Analysis of the Information Content of Address Reference Steams," Proc. of the 24th Annual International Symposium on Microarchitecture, 1991, pp 19-24.

A. D. Samples, "Mache: No-Loss Trace Compaction," Proc. of 1989 ACM SIGMETRICS International Conference on Measurement and Modeling of Computer Systems, 1989, pp 89-97.

* cited by examiner

*Primary Examiner*—Pierre M. Vital
(74) *Attorney, Agent, or Firm*—Larry M. Mennemeier

(57) ABSTRACT

A method and apparatus for decompressing relative addresses. A compressed relative address is retrieved from one or more micro-operation entries of a micro-operation storage and an uncompressed relative address is reconstructed from the compressed relative address and an instruction pointer (IP) address associated with the head of the micro-operation storage line in which the compressed relative address was stored. IP-relative addresses may be computed in a manner similar to relative branch targets, then compressed and stored in one or more micro-operation entries of a micro-operation storage line to be reconstructed later according to an IP address associated with the respective micro-operation storage line in which their compressed counterpart was stored.

34 Claims, 18 Drawing Sheets

METHOD AND APPARATUS FOR DECOMPRESSING RELATIVE ADDRESSES

FIELD OF THE DISCLOSURE

This disclosure relates generally to the field of processors. In particular, the disclosure relates to calculation and storage of addresses of a relative addressing mode in a compressed storage format.

BACKGROUND OF THE DISCLOSURE

An instruction for processing in a computer is typically made up of various constituent parts including, for example, an operation and operands. These constituent parts may be encoded into fields of the instruction, each field comprising one or more binary digit or bit. The number of binary encodings that can be represented by a field of N bits is $2^N$. For example, a 3-bit field for representing a register operand may be used to represent one of eight registers. An 8-bit field for representing an immediate operand may be used to represent one of two hundred and fifty-six numerical values.

Operands in memory may be addressed by a variety of referencing techniques, often called addressing modes. Typical addressing modes include: direct addressing, register-indirect addressing, and register-relative addressing. Direct addressing is fast but requires the instruction to completely specify a memory address.

Modern computer systems more commonly use some form of register indirection in combination with operating system techniques such as paging or segmentation to provide flexible user access to a virtual address space and efficient system management of physical memory resources. These other addressing modes typically require a processor to dynamically compute virtual addresses in order to access memory operands.

For some processors, for example complex instruction set computer (CISC) processors, instructions are translated or converted into simpler instructions, often called micro-operations. These micro-operations may be more efficiently executed by highly pipelined or parallel hardware. For example, an instruction having a memory operand may be translated into a first micro-operation for computing an address, a second micro-operation for accessing data at the computed address, and a third micro-operation for performing the function associated with the instruction on the data retrieved from memory.

As software becomes more complex and processors execute more instructions in shorter periods of time, larger addressable memory spaces for data and instructions are required. These larger addressable spaces require larger addresses, which take longer for micro-operations to compute and require more space to store and transmit the addresses from micro-operation to micro-operation. To further complicate matters, modern processors no longer work on just a few instructions concurrently, but instead store and process thousands of micro-operations at a time, requiring substantially more storage space to provide for these larger addresses.

BRIEF DESCRIPTION OF THE DRAWINGS

The present invention is illustrated by way of example and not limitation in the figures of the accompanying drawings.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Disclosed herein is a process for compressed storage of relative addresses. For one embodiment of relative virtual addresses, an address is computed in a stage of a processor pipeline and then compressed according to one or more compression techniques for storage in a processor trace cache. For one embodiment of compressed relative address storage, a compressed relative address is retrieved from one or more micro-operation entries of a micro-operation storage or a processor trace cache. An uncompressed virtual address is reconstructed from the compressed relative address and an instruction pointer address associated with the head of the micro-operation storage line in which the compressed relative address was stored. For one embodiment of a processor, relative virtual addresses of move (MOV) instructions are computed in a manner similar to relative branch targets and then compressed and stored in one or more micro-operation entries of a trace-cache line. The relative virtual addresses are later reconstructed with respect to instruction pointer (IP) addresses associated with the micro-operation storage lines in which their compressed counterparts were stored.

For the purpose of the following discussion a micro-operation storage may be any one of a number of storage structures for execution of instructions in which decoded or translated micro-operations or pointers to micro-operations may be stored: for example a trace cache, a processor pipeline FIFO, a scheduling queue, a reorder buffer, etc.

Figure 1A:
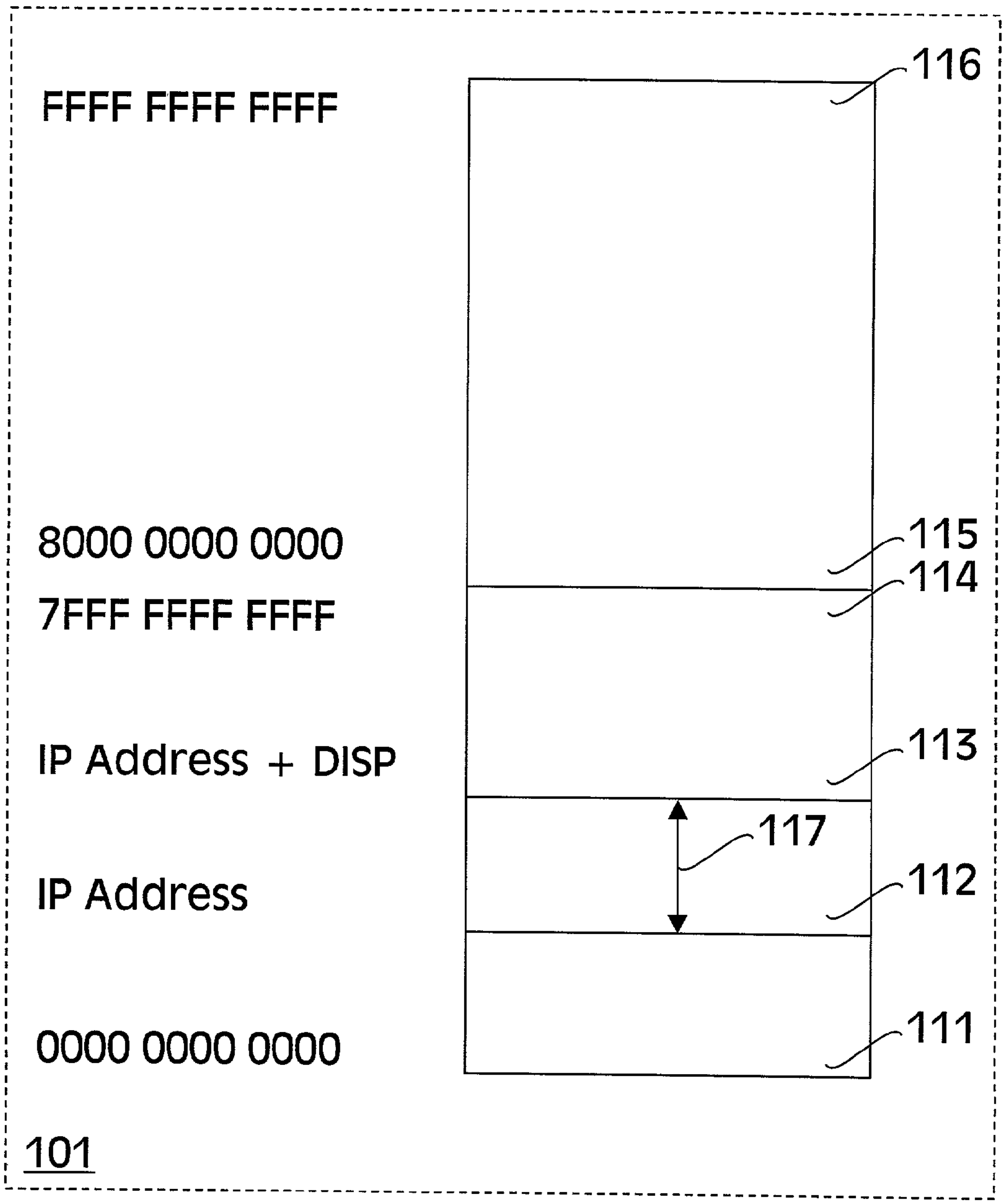
FIG. 1*a* illustrates an example of an address space and use of relative addressing.

FIG. 1*a* illustrates an example of an address space 101 and use of relative addressing. In the address space 101, the addresses extend from the lowest storage location 111 addressable by a 48-bit hexadecimal address of 0000 0000 0000, to the highest storage location 111 addressable by a 48-bit hexadecimal address of FFFF FFFF FFFF. The relative address of storage location 113 differs by a positive displacement (DISP) 117 from an IP address of storage location 112. Such relative addressing provides for relocation of executable instructions and data to different portions of sequential storage locations within address space 101.

In the address space 101, the middle addresses extend continuously through storage location 114 addressable by a 48-bit hexadecimal address of 7FFF FFFF FFFF, to storage location 115 addressable by a 48-bit hexadecimal address of 8000 0000 0000.

Figure 1B:
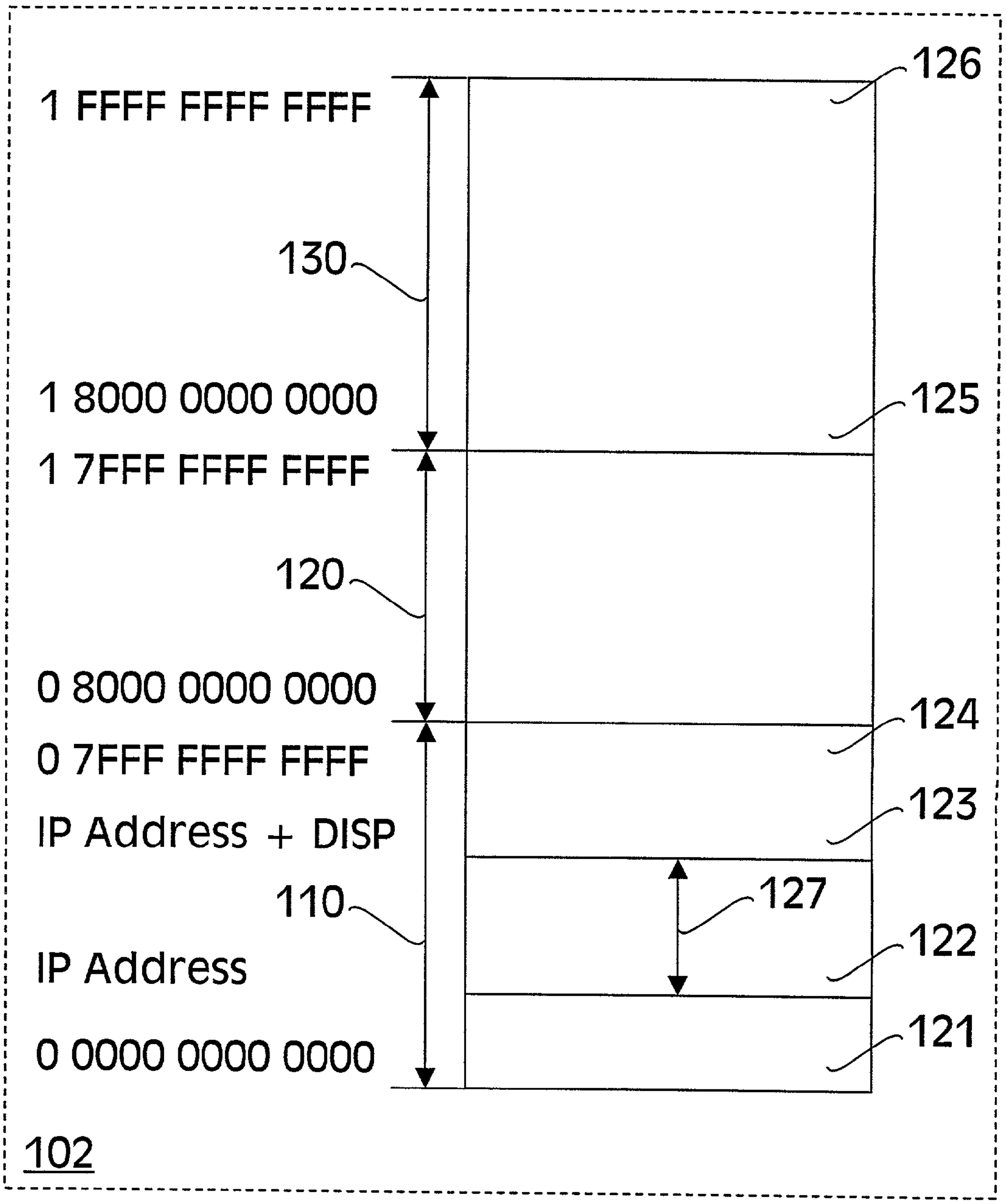
FIG. 1*b* illustrates an alternative example of an address space and use of relative addressing.

FIG. 1*b* illustrates an alternative example of an address space 102 and use of relative addressing. Address space 102 comprises canonical address spaces 110 and 130, in which 48-bit addresses are sign extended to 64 bits. In the canonical address space 110, the addresses extend from the lowest storage location 121 addressable by a 64-bit hexadecimal address of 0000 0000 0000 0000, to storage location 124 addressable by the highest positive 48-bit hexadecimal address of 7FFF FFFF FFFF, which is sign extended to 64-bits. In the canonical address space 130, the addresses extend from storage location 125 addressable by the lowest negative 48-bit hexadecimal address of 8000 0000 0000, which is sign extended to 64-bits, to the highest storage location 126 addressable by the highest negative 64-bit hexadecimal address of FFFF FFFF FFFF FFFF. Again, the relative address of storage location 123 differs by a positive displacement (DISP) 127 from an IP address corresponding to storage location 122.

Addresses in the non-canonical address space 120 are all the addresses between hexadecimal addresses 0000 8000 0000 0000 and FFFF 7FFF FFFF FFFF inclusive. Non-canonical addresses may be reserved to provide for future expansion of address space 102.

Figure 2:
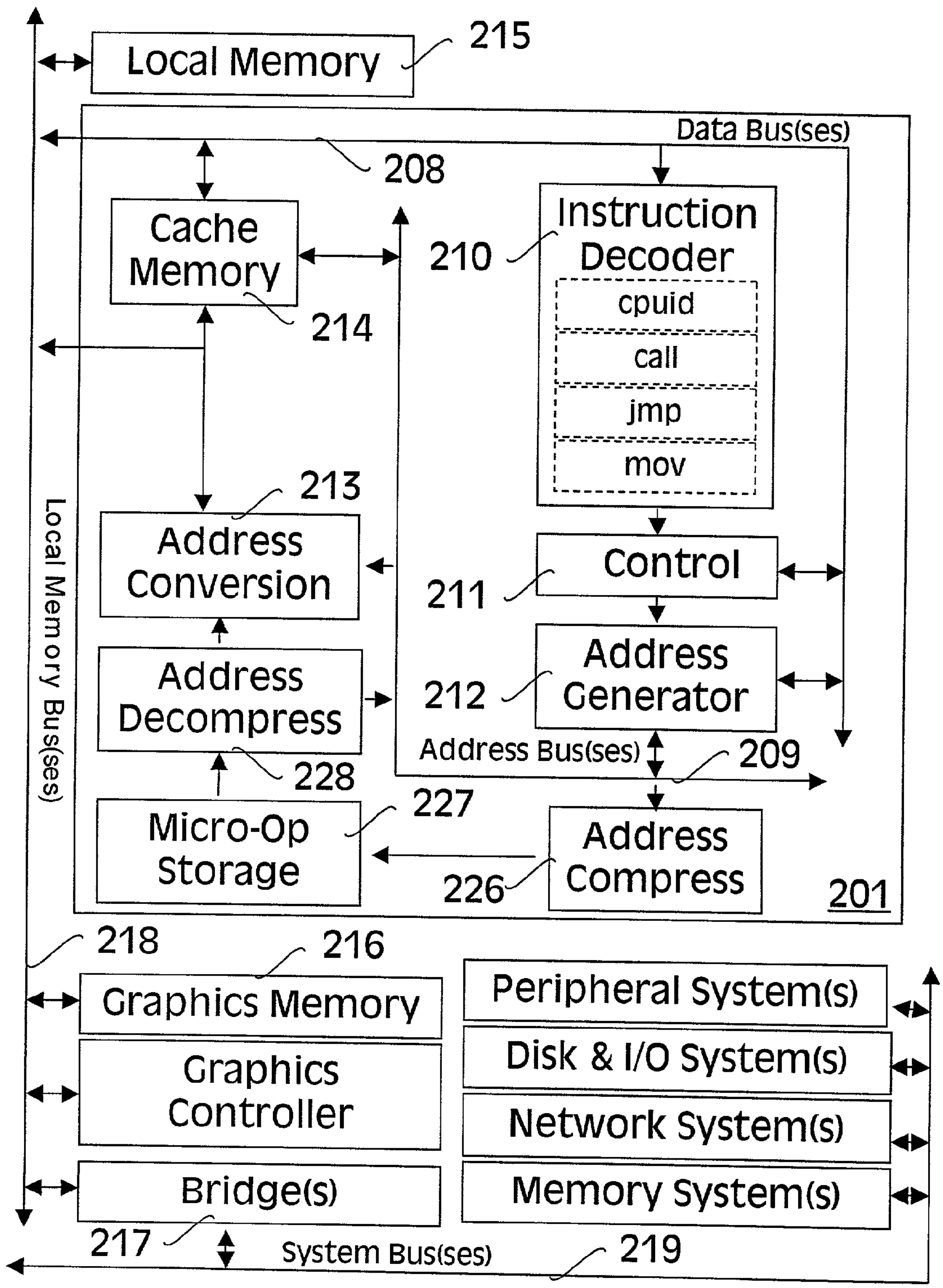
FIG. 2 illustrates one embodiment of a computing system, which uses compressed relative addresses.

FIG. 2 illustrates one embodiment of a computing system, which uses compressed relative addresses. The computing system comprises processor 201, local memory bus(ses) 218 and local memory 215. Local memory 215 is addressable by address generator 212 of processor 201 through address bus(ses) 209 and address conversion logic 213, providing access to instructions and data through data bus(ses) 208. Processor 201 includes instruction decoder 210 for converting instructions into micro-operation sequences. Processor 201 also includes micro-operation storage 227 for storing micro-operations of the sequences for execution. Micro-operations may be supplied by instruction decoder 210 or by micro-operation storage 227 for execution by processor 201.

For one embodiment instruction decoder 210 may receive an instruction specifying a relative address and decode such an instruction into one or more micro-operations for storage in micro-operation storage 227. Address generator 212 may compute the relative address for the instruction and provide the computed relative address to address compression logic 226. Address compression logic 226 may store the compressed relative address as an immediate data with the one or more micro-operations in micro-operation storage 227. Address decompression logic 228 may reconstruct an uncompressed relative address from the immediate data stored in micro-operation storage 227 and an instruction pointer associated with the storage location of the one or more micro-operations. For one embodiment, instruction decoder 210 may decode an instruction specifying a canonical relative address of 64-bits into one or more micro-operations having an immediate data for reconstruction of an uncompressed relative address from two 17-bit portions of the immediate data and store the one or more micro-operations in micro-operation storage 227, but the invention is not so limited.

Processor 201 may also include cache memory 214, and instruction decoder 210 may decode for execution an instruction set, the instruction set comprising, for example, a CPUID instruction, a CALL instruction, a JMP instruction and a MOV instruction. Such instructions may be fetched from cache memory 214 using addresses received via address bus(ses) 209 or using addresses received via address conversion logic 213. Alternatively, corresponding micro-operation sequences for such instructions may be fetched directly from micro-operation storage 227.

The computing system may also include additional components such as graphics memory 216 and/or bridges 217 and system bus(ses) 219 which similarly facilitate storage and transfer of instructions and or data. It will be appreciated that such a computing system may include any number of other additional components such as, for example, a graphics controller, peripheral system(s), disk and I/O system(s), network system(s) and additional memory system(s).

Figure 3:
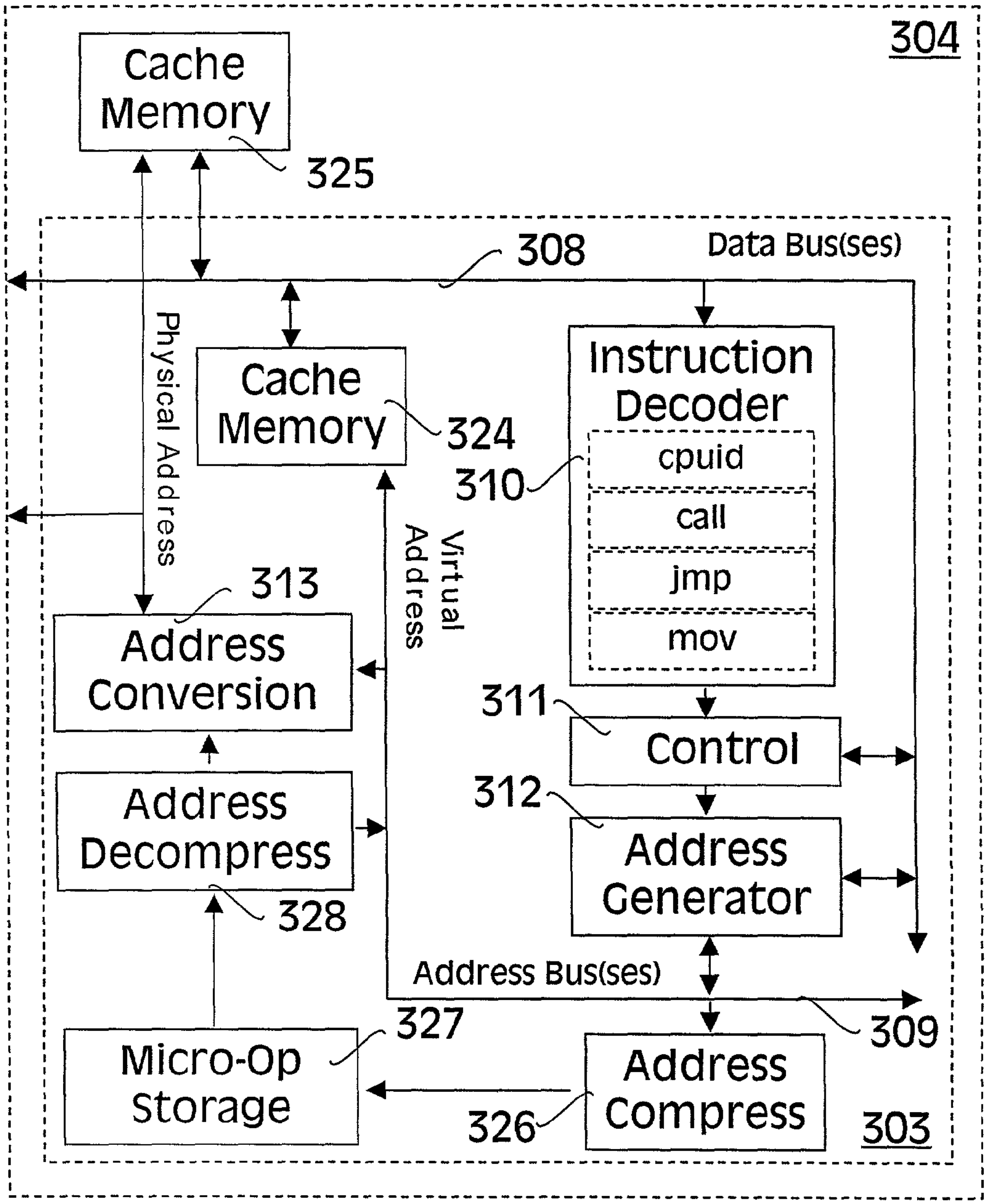
FIG. 3 illustrates embodiments of a processor, which uses compressed relative addresses.

FIG. 3 illustrates one embodiment of a processor 303, which uses compressed relative addresses. Processor 303 includes instruction decoder 310 for converting instructions of an instruction set into micro-operation sequences, the instruction set comprising, for example, a CPUID instruction, a CALL instruction, a JMP instruction and a MOV instruction. For one embodiment instruction decoder 310 may decode, for example, a MOV instruction with a relative address of 48-bits, or instruction decoder 310 may also decode a MOV instruction with a canonical relative address of 64-bits. Processor 303 also includes micro-operation storage 327 for storing the micro-operations of micro-operation sequences for execution by processor 303. For one embodiment instruction decoder 310 may receive an instruction specifying a relative address and decode such an instruction into one or more micro-operations for storage in micro-operation storage 327. Address generator 312 may compute the relative address for the instruction and provide the computed relative address to address compression logic 326. Address compression logic 326 may store the compressed relative address as an immediate data with the one or more micro-operations in micro-operation storage 327. Address decompression logic 328 may reconstruct an uncompressed relative address from the immediate data stored in micro-operation storage 327 and an instruction pointer for the head of a storage line of micro-operation storage 327. For one embodiment micro-operation storage 327 may store immediate data with one or more micro-operations for an instruction to reconstruct an uncompressed 48-bit relative address using a 34-bit immediate data and a portion of an instruction pointer for the head of a storage line of micro-operation storage 327, but the invention is not so limited.

Processor 303 may also include cache memory 324. Instructions may be fetched using addresses received via address bus(ses) 309 from cache memory 324 or corresponding micro-operation sequences may be fetched directly from micro-operation storage 327. For an alternative embodiment, a processor 304 may also include cache memory 325, and address conversion logic 313. Instructions may be fetched from cache memory 325 using virtual addresses received via address bus(ses) 309 and converted to physical addresses by conversion logic 313 or corresponding micro-operation sequences may be fetched directly from micro-operation storage 327.

Figure 4A:
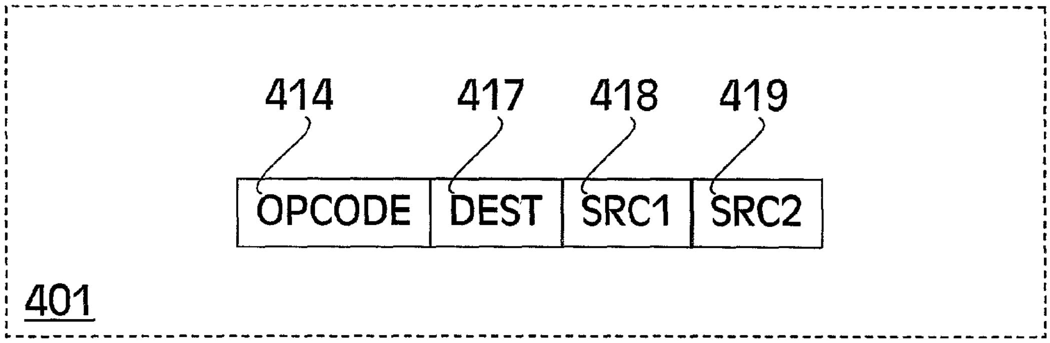
FIG. 4*a* illustrates an example of an instruction format for execution of instructions on a processor.

FIG. 4*a* illustrates an example of an instruction format 401 for execution of instructions on a processor, for example, processor 201, processor 303 or processor 304. Instruction format 401 includes OPCODE 414, and optionally includes a destination operand DEST 417, source operand SRC1 418 and source operand SRC2 419. Instruction format 401 may be of fixed length or of variable length. Optional destination operand DEST 417 and source operands SRC1 418 and SRC2 419 may directly or indirectly indicate register locations or memory locations or may optionally include immediate data operands.

Figure 4B:
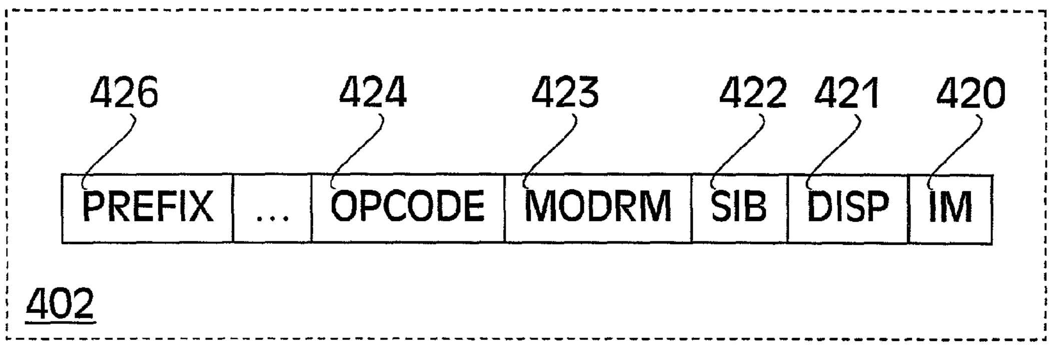
FIG. 4*b* illustrates an alternative example of an instruction format for execution of instructions on a processor.

FIG. 4*b* illustrates another example of an instruction format 402 for execution of instructions on a processor. This format corresponds with the general Intel® integer opcode format described in the "IA-32 Intel Architecture Software Developer's Manual, Volume 2: Instruction Set Reference," available from Intel Corporation, by calling 1-800-548-4725 or by visiting Intel's literature center at http://www.intel.com. Instruction format 402 includes OPCODE 424, which may comprise one or more bytes. Instruction format 402 optionally includes prefixes such as PREFIX 426, a MODRM 423 byte, an SIB 422 byte, one or more DISP 421 bytes and one or more IM 420 bytes. In one embodiment a source register address or destination register address may be provided in OPCODE 424. In another embodiment, a MODRM 423 byte includes a source register address at bits three through five, which also corresponds to a destination register address. In an alternate embodiment, bits three through five of the MODRM 423 byte corresponds to an opcode extension. In another alternate embodiment, a MODRM 423 byte includes a source register address at bits zero through two, which also corresponds to a destination register address.

In one embodiment, instruction format 402 provides for a memory source address or a memory destination address to be calculated according to an addressing mode provided by instruction format 402. This general format allows register to register, memory to register, register by memory, register by register, register by immediate, and register to memory addressing. In one embodiment, instruction format 402 provides for a programmer to include a relative displacement value in the one or more DISP 421 bytes. Features of instruction format 402 are described in more detail in the "IA-32 Intel Architecture Software Developer's Manual, Volume 2: Instruction Set Reference," in Chapter 2 and Appendix B.

In one embodiment, instruction format 402 provides for an OPCODE 424 associated with a memory address of a default size and/or an operand of a default size. For example, a mode of operation may be provided for a processor, which has by default a 32-bit operand size and a 64-bit memory address size. Alternatively, default 64-bit operand sizes and memory address sizes may be used. For one embodiment of such a processor, the 64-bit memory addresses that are supported must be in a canonical form. It will be appreciated that other modes of operation having various default sizes may also be provided or that a particular OPCODE 424, PREFIX 426, or MODRM 423 encoding may be used to modify or override the default sizes, and that such modifications may be made without departing from the spirit of the invention as claimed.

Figure 4C:
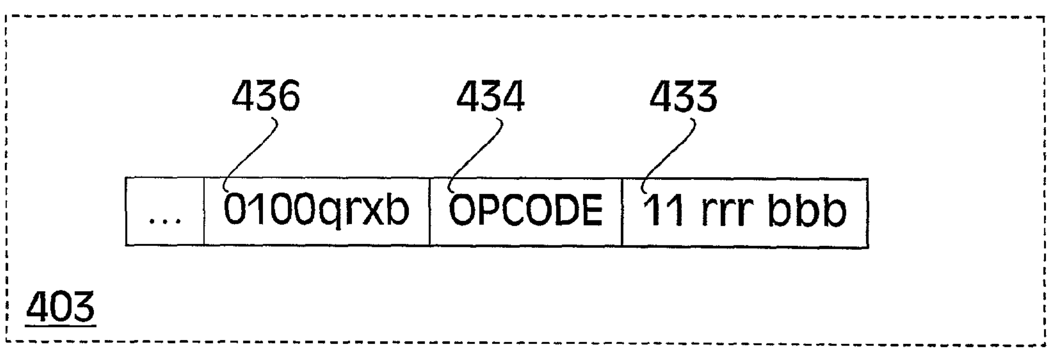
FIG. 4*c* illustrates an example of an instruction format permitting an optional extension prefix.

FIG. 4*c* illustrates, for example, an instruction format 403 permitting an optional extension PREFIX 436. The optional extension PREFIX 436 may be used to modify a default operand size to 64-bits by setting q equal to 1, for example, or to modify either or both register addresses (specified by bits three through five and bits zero through two) in a MODRM 433 byte (by respectively setting r equal to 1 or b equal to 1 in the optional extension PREFIX 436).

Figure 4D:
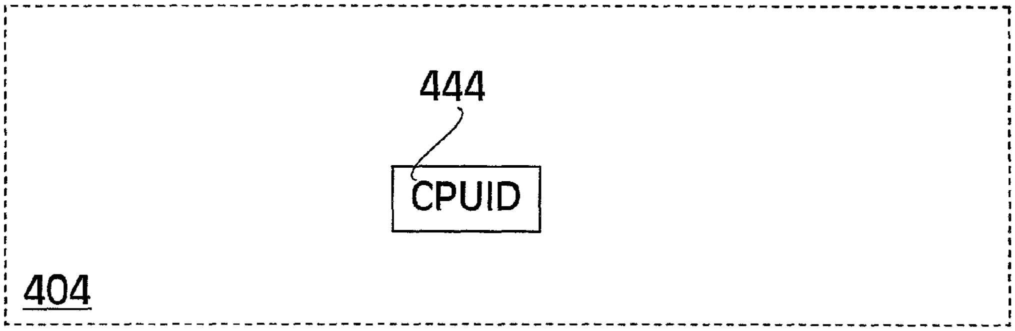
FIG. 4*d* illustrates an example of an instruction format for execution of a CPUID instruction on a processor.

FIG. 4*d* illustrates an example of an instruction format 404 for execution of an OPCODE 444 of a CPUID instruction on a processor. In one embodiment a CPUID instruction receives arguments implicitly from a register. For example, if a hexadecimal value of 8000 0001 is stored in register EAX, and the CPUID instruction is executed, an extended processor signature and extended feature bits may be returned. Alternatively, if the hexadecimal values of 8000 0002 and 8000 0003 are stored in register EAX, and the CPUID instruction is executed, twice, once with each value, an ASCII string representing the processor brand name may be returned. One or more of the extended feature bits returned by the CPUID instruction may be set to indicate that the processor supports a particular extended feature, for example, support for 64-bit addresses or data may be indicated by an extended feature bit 29 being set to a value of 1.

Figure 4E:
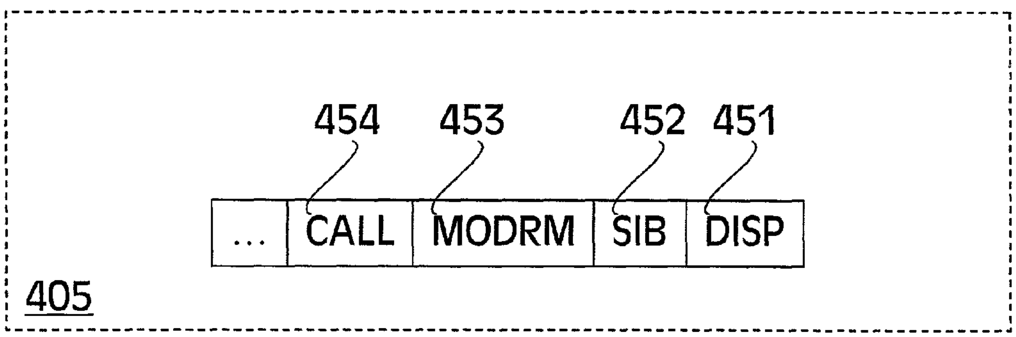
FIG. 4*e* illustrates an example of an instruction format for execution of a CALL instruction on a processor.

FIG. 4*e* illustrates an example of an instruction format 405 for execution of an OPCODE 454 of a CALL instruction on a processor. Instruction format 405 optionally includes prefixes, MODRM 453 byte, SIB 452 byte and one or more DISP 451 bytes. Instruction format 405 may be used, for example, to execute an OPCODE 454 of an itrasegment near CALL to a procedure within a current code segment, or to execute an OPCODE 454 of an itersegment far CALL to a procedure in a different code segment, or to execute an OPCODE 454 of an iter-privilege-level far CALL to a procedure in a segment at a different privilege level than the executing procedure or program, or alternatively to execute an OPCODE 454 of a CALL to a procedure in a different task. The MODRM 453 byte may optionally be used to provide a 3-bit extension to OPCODE 454. An address for the called procedure may be indicated directly or indirectly by a selected combination of OPCODE 454, MODRM 453 byte, SIB 452 byte and one or more DISP 451 bytes. For example, an OPCODE 454 having a hexadecimal value of E8 may indicate a direct near CALL using a DISP 451 relative to the next instruction; an OPCODE 454 having a hexadecimal value of FF may indicate an indirect CALL using a near or far address given in a register or memory location indicated by the MODRM 453 byte, and the optional SIB 452 byte and one or more DISP 451 bytes, and an OPCODE 454 having a hexadecimal value of 9A may indicate a direct far CALL using an absolute address indicated by the MODRM 453 byte, and the optional SIB 452 byte and one or more DISP 451 bytes.

Figure 4F:
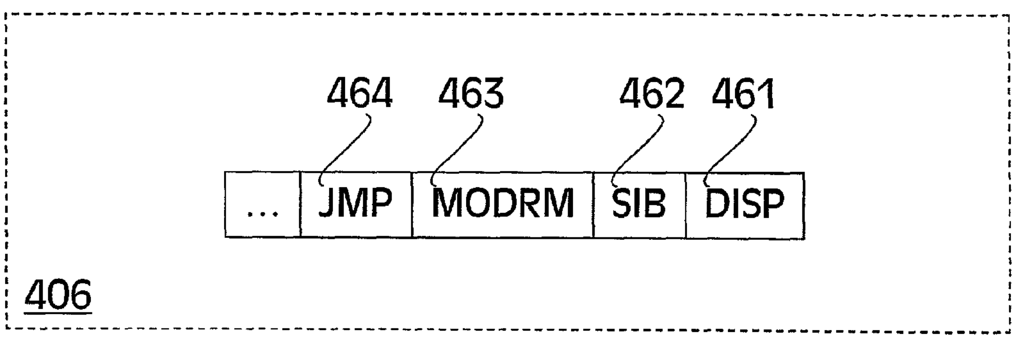
FIG. 4*f* illustrates an example of an instruction format for execution of a JMP instruction on a processor.

FIG. 4*f* illustrates an example of an instruction format 406 for execution of an OPCODE 464 of a JMP instruction on a processor. Instruction format 406 optionally includes prefixes, MODRM 463 byte, SIB 462 byte and one or more DISP 461 bytes. Instruction format 406 may be used, for example, to execute an OPCODE 464 of an itrasegment short or near JMP to an instruction within a current code segment, or to execute an OPCODE 464 of an itersegment far JMP to an instruction in a different code segment, or to execute an OPCODE 464 of a JMP to a different task. The MODRM 463 byte may optionally be used to provide a 3-bit extension to OPCODE 464. A target address may be indicated directly or indirectly by a selected combination of OPCODE 464, MODRM 463 byte, SIB 462 byte and one or more DISP 461 bytes. For example, a 1-byte OPCODE 464 having a hexadecimal value of EB or E9 may indicate a direct near JMP using a DISP 461 relative to the next instruction; an OPCODE 464 having a hexadecimal value of FF may indicate an indirect JMP using a near or far address given in a register or memory location indicated by the MODRM 453 byte, and the optional SIB 452 byte and one or more DISP 451 bytes, and an OPCODE 464 having a hexadecimal value of EA may indicate a direct far JMP using an absolute address indicated by the MODRM 463 byte, and the optional SIB 462 byte and one or more DISP 461 bytes. Alternatively, a 2-byte OPCODE 464 beginning with a hexadecimal value of 0F8 may indicate a direct near conditional JMP using a DISP 461 relative to the next instruction.

For one embodiment of a processor and a particular mode of operation, instructions such as CALL and JMP may indicate, by default, 64-bit memory addresses. For an alternative embodiment, only CALL or JMP instructions having particular opcodes or being of a particular type, for example, near CALL instructions and near or short JMP instructions, indicate a 64-bit address by default. For one embodiment a DISP 451 or DISP 461 may include a 32-bit relative displacement, but the invention is not so limited. For an alternative embodiment a DISP 451 or DISP 461 may also include a 64-bit long immediate offset. It will be appreciated that other instructions may similarly be included for control of execution flow in a processor which uses compressed relative addresses, for example, RETURN, LOOP, POP, PUSH, ENTER, or LEAVE.

Figure 4G:
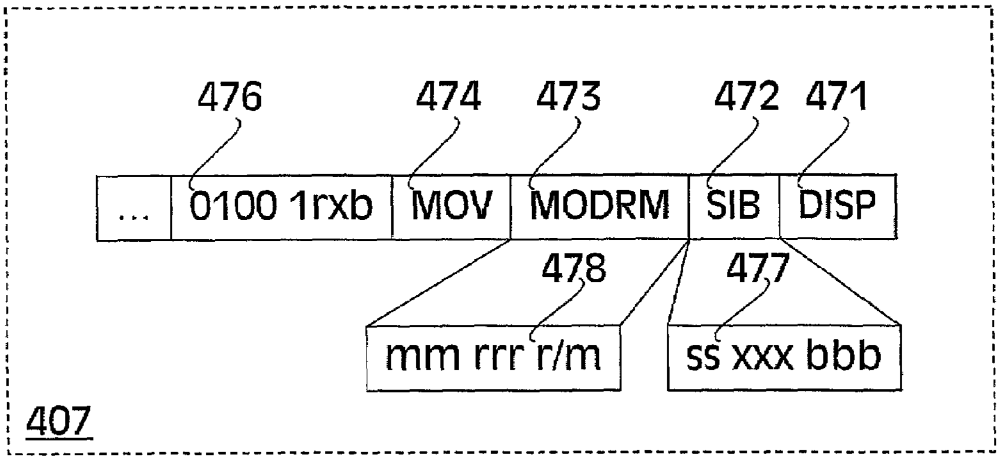
FIG. 4*g* illustrates an example of an instruction format for execution of a MOV instruction on a processor to move data to or from an addressable storage location.

FIG. 4*g* illustrates an example of an instruction format 407 for execution on a processor of an OPCODE 474 of a MOV instruction to move data to or from an addressable storage location. Instruction format 407 optionally includes prefixes such as PREFIX 476, and one or more DISP 471 bytes. Instruction format 407 may be used, for example, to execute an OPCODE 474 of a MOV instruction to move data to or from a storage location in memory addressable relative to the next instruction. A MODRM 473 byte of format 478 may optionally be used with OPCODE 474 to provide a 2-bit addressing mode (mm), a 3-bit opcode extension and/or register address (rrr) and a register or memory addressing mode (r/m) optionally including an SIB 472 byte and one or more DISP 471 bytes. An SIB 472 byte of format 477 may optionally be used with MODRM 473 to provide a 2-bit scale factor (ss), a 3-bit index register (xxx) and a 3-bit base register (bbb).

Figure 4H:
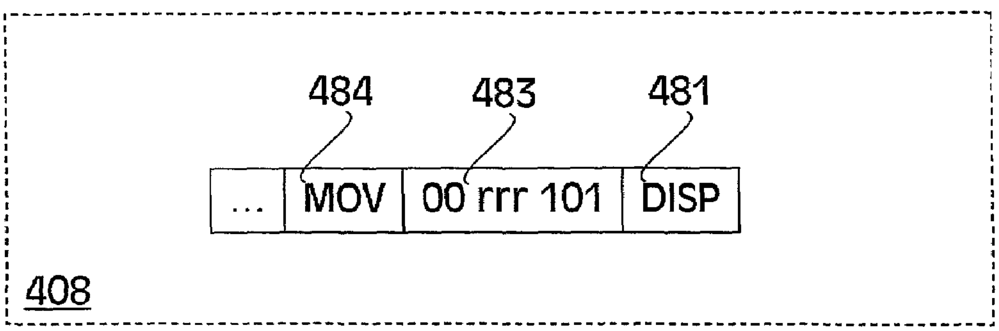
FIG. 4*h* illustrates an example of an instruction format for execution of a MOV instruction on a processor to move data to or from a storage location using a relative address.

FIG. 4*h* illustrates one alternative example of an instruction format 408 for execution on a processor of an OPCODE 484 of a MOV instruction to move data to or from a storage location using a relative address. Instruction format 408 includes an OPCODE 484 byte beginning with, for example, a binary value of 101000 (hexadecimal values A0–A3) to indicate the type of MOV instruction; and also includes one or more DISP 481 bytes to specify a memory offset relative to a base address, for example, an instruction pointer address. A MODRM 483 byte may optionally be used with OPCODE 484 to provide, for example, a 2-bit memory addressing mode equal to zero (00), a 3-bit register address (rrr), and a 3-bit relative addressing mode equal to five (101), the relative address specification including one or more DISP 481 bytes. Bit one of the OPCODE 484 byte may be set to indicate that the MOV instruction is to store data from a register to the memory location addressed by DISP 481, or may be cleared to indicate that the MOV instruction is to load data to a register from the memory location addressed by DISP 481. Bit zero of the OPCODE 484 byte may be set to indicate that the MOV instruction will use a default word size for the data, or may be cleared to indicate a 1-byte data size. Alternatively, an optional prefix may be included in instruction format 408 to modify or override the default word size. The memory offset specified by DISP 481 may also be of a default size according to a particular mode of operation of the processor.

Figure 5A:
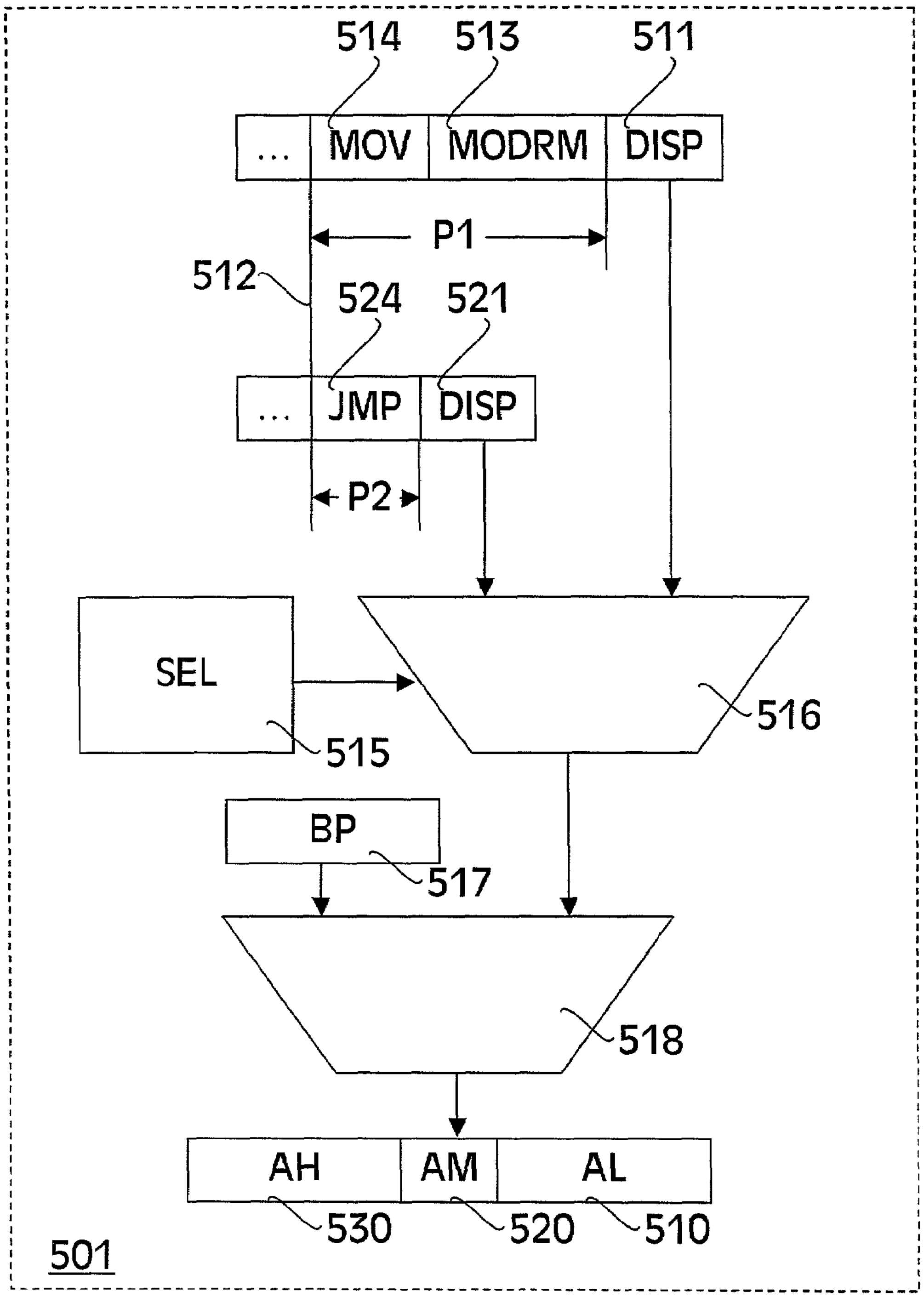
FIG. 5*a* illustrates one embodiment of an apparatus to compute a relative address for storage in a compressed form as an immediate data.

FIG. 5*a* illustrates one embodiment of an apparatus 501 to compute a relative address for storage in a compressed form as an immediate data. Apparatus 501 comprises address generation logic 518 and displacement routing logic 516. Address generation logic 518 may comprise, for example, an adder. Address generation logic 518 may also comprise error detection logic. Displacement routing logic 516 may comprise, for example, a latch or register. Displacement routing logic 516 may also comprise a multiplexer.

Displacement routing logic 516 provides a displacement to address generation logic 518 responsive to selection logic 515, the displacement selected from an instruction, for example, DISP 511 at position P1 relative to the opcode 514 position 512 or DISP 521 at position P2 relative to the opcode 524 position 512. P1 may differ from P2 due to the type of instruction, for example, a MOV instruction may include a MODRM 513 byte and a relative JMP instruction may not.

The selected displacement is combined with a base pointer (BP) address 517 by address generation logic 518 to generate an N-bit relative address, the relative address comprising a high-order portion 530, a middle-order portion 520, and a low-order portion 510. The N-bit relative address may be compressed, the middle-order portion 520 and the low-order portion 510 being stored as parts of an M-bit immediate data for reconstruction of the uncompressed relative address.

Figure 5B:
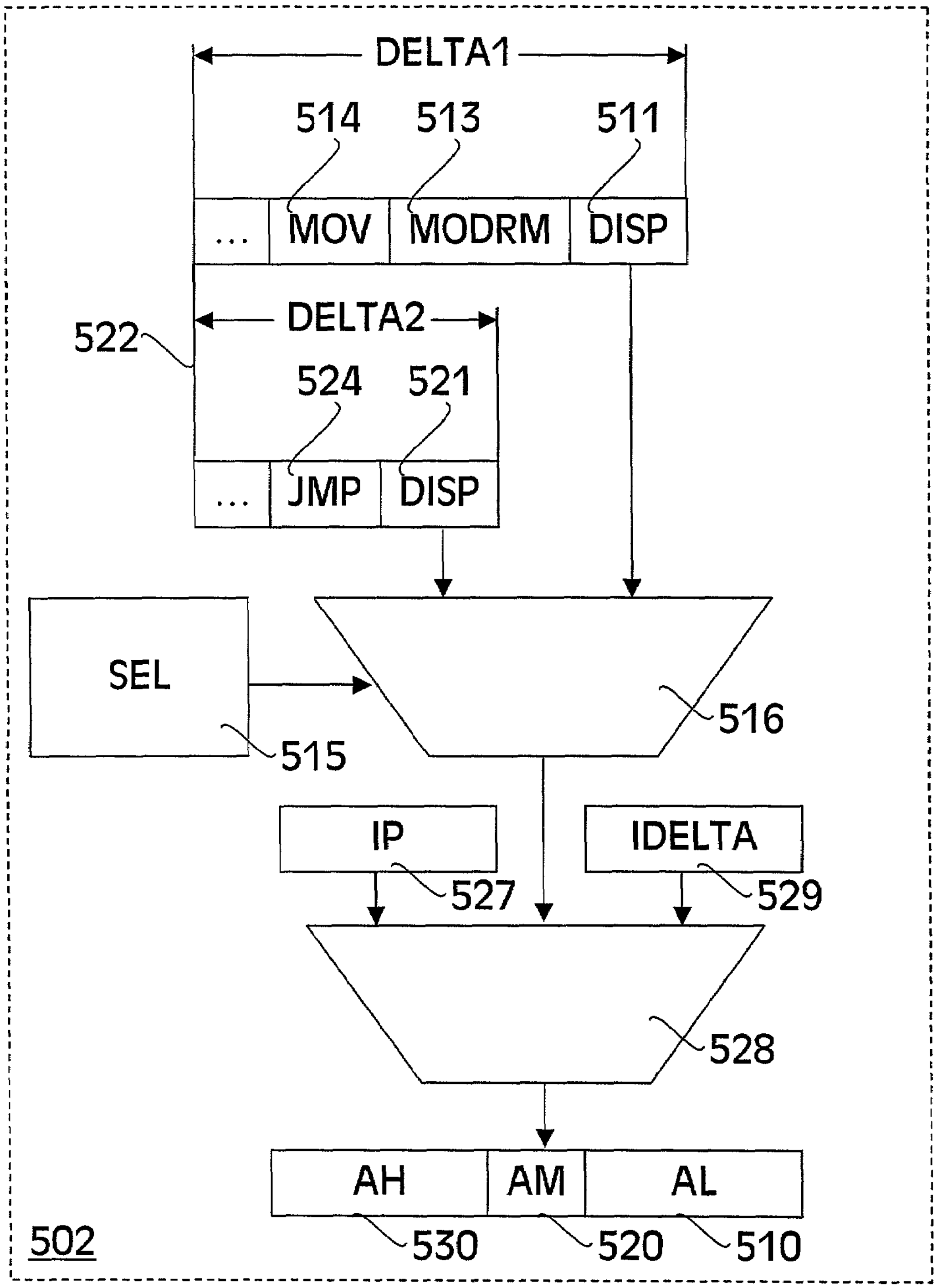
FIG. 5*b* illustrates an alternative embodiment of an apparatus to compute a relative address for storage in a compressed form as an immediate data.

FIG. 5*b* illustrates an alternative embodiment of an apparatus 502 to compute a relative address for storage in a compressed form as an immediate data. Apparatus 502 comprises address generation logic 528 and displacement routing logic 516. Displacement routing logic 516 provides a displacement to address generation logic 518 responsive to selection logic 515 as described with respect to FIG. 5*a*.

The selected displacement is combined with an instruction pointer (IP) address 527 and an instruction delta 529 (IDELTA) by address generation logic 528 to generate an N-bit relative address, the relative address comprising a high-order portion 530, a middle-order portion 520, and a low-order portion 510. The instruction delta 529 is the length in bytes of the particular instruction. For example, when DISP 511 is provided to address generation logic 528 the instruction delta 529 is equal to the number of bytes from the beginning of the first instruction byte at position 522 to the end of the last DISP 511 byte (DELTA1). On the other hand, when DISP 521 is provided to address generation logic 528, the instruction delta 529 is equal to the number of bytes from the beginning of the first instruction byte at position 522 to the end of the last DISP 521 byte (DELTA2). Therefore, the N-bit relative address thus generated is relative to the next instruction.

The N-bit relative address may be compressed, the middle-order portion 520 and the low-order portion 510 being stored as parts of an M-bit immediate data for reconstruction of the uncompressed relative address. For one embodiment of the M-bit immediate data, the middle-order portion 520 comprises a correction field to adjust a stored instruction pointer for reconstruction of the uncompressed relative address, but the invention is not so limited.

It will be appreciated that an apparatus 501 or an apparatus 502 may provide for sharing of computational resources to generate relative addresses for data movement instructions and for relative branch instructions.

Figure 6:
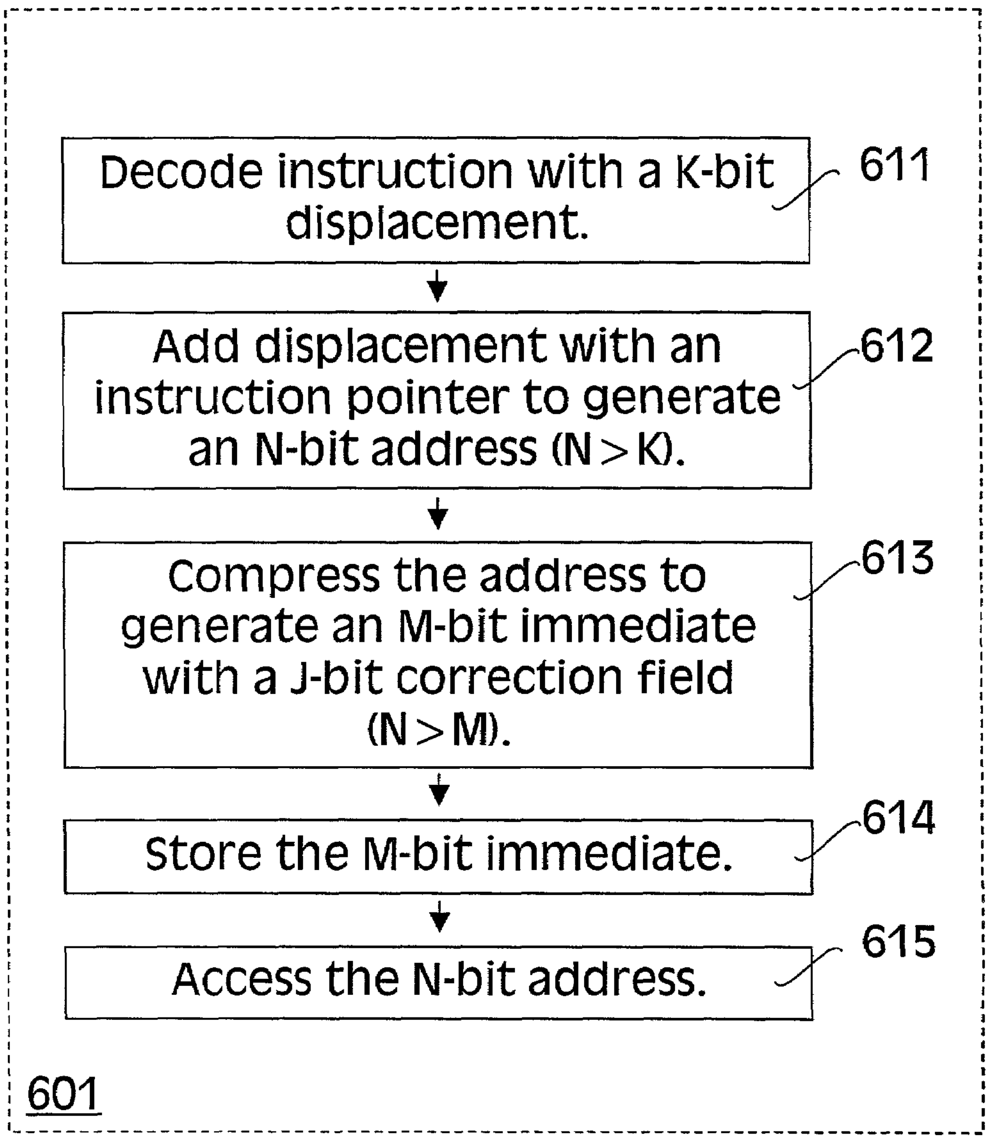
FIG. 6 illustrates a flow diagram for one embodiment of a process to decode an instruction and to compute a relative address for storage in a compressed form as an immediate data.

FIG. 6 illustrates a flow diagram for one embodiment of a process 601 to decode an instruction and to compute a relative address for storage in a compressed form as an immediate data. Process 601 and other processes herein disclosed are performed by processing blocks that may comprise dedicated hardware or software or firmware operation codes executable by general purpose machines or by special purpose machines or by a combination of both.

In processing block 611 an instruction using relative addressing is decoded, the instruction specifying a K-bit relative displacement value. Processing then continues in processing block 612 where the displacement is added to an instruction pointer to generate an N-bit address, wherein N is a larger integer value than K. In processing block 613, the N-bit address is compressed to generate an M-bit immediate (N being a larger integer value than M), the M-bit immediate having a J-bit correction field. Processing proceeds in processing block 614 where the M-bit immediate is stored, for example in a micro-operation storage. Finally, in processing block 615, the N-bit address is accessed, for example, by executing a micro-operation which may include decompression of the N-bit address in part from the M-bit immediate. Decompression of the N-bit address in part from the M-bit immediate is discussed in detail below, especially with respect to FIGS. 11*a*–11*d*.

For one embodiment of process 601, a 32-bit relative displacement is used to generate a 48-bit relative address, the 48-bit relative address being compressed to generate a 34-bit immediate having a 2-bit correction field, but the invention is not so limited. It will be appreciated that substantial savings may be realized in a micro-operation storage, for example, by using compressed relative addresses.

Figure 7:
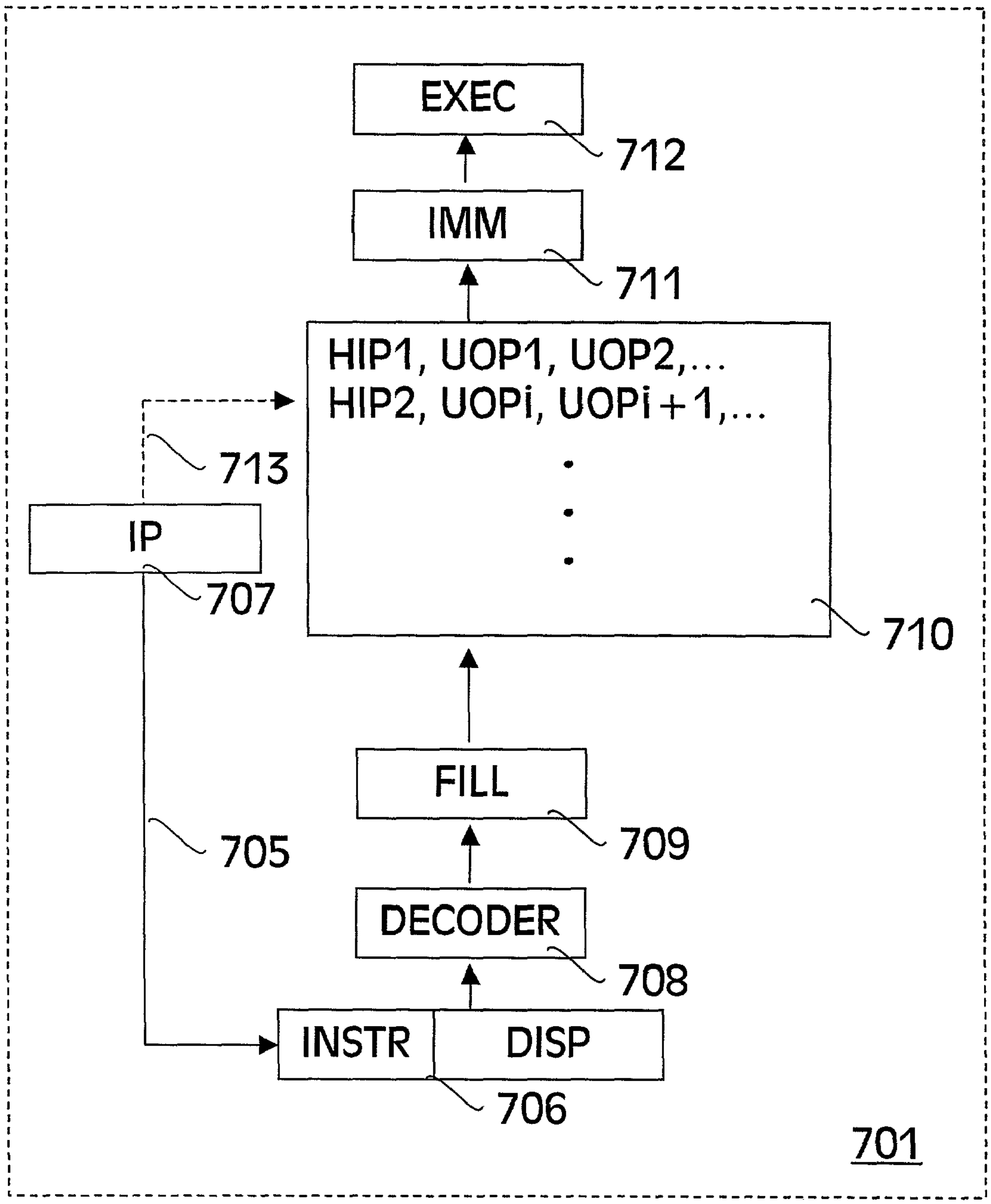
FIG. 7 illustrates one embodiment of an apparatus to decode an instruction and to store a micro-operation having a relative address in compressed form as an immediate data.

FIG. 7 illustrates one embodiment of an apparatus 701 to decode an instruction 706 and to store a micro-operation having a relative address in compressed form as an immediate data. Apparatus 701 comprises fill logic 709, micro-operation storage 710, and immediate processing logic 711. Fill logic 709 may comprise, for example, address compression logic. Fill logic 709 may also comprise address generation logic, a buffer to build a micro-operation storage line, immediate scavenging logic to share immediate storage between micro-operations or build logic to enforce restrictions on the contents of a micro-operation storage line. Immediate processing logic 711 may comprise, for example, address decompression logic. Immediate processing logic 711 may also comprise, immediate descavenging logic to recover immediate data from multiple micro-operations, or instruction-pointer tracking logic.

Immediate processing logic 711 may access an M-bit immediate from one or more micro-operations stored in micro-operation storage 710, and an instruction pointer for the head of a micro-operation storage line (for example HIP1 or HIP2). From the M-bit immediate and the instruction pointer, immediate processing logic 711 reconstructs an uncompressed N-bit relative address. For one embodiment of micro-operation storage 710, micro-operations (for example UOP1 and UOP2) are stored in micro-operation lines generated by fill logic 709, together with an instruction pointer for a micro-operation at the head of each micro-operation storage line.

Apparatus 701 may further comprise decoder 708, an instruction pointer 707, and execution logic 712. Fill logic 709 may generate an N-bit relative address from instruction pointer 707, an instruction delta for instruction 706 provided by decoder 708, and a K-bit displacement (DISP) of instruction 706. For one embodiment of fill logic 709, the instruction pointer for the head of a micro-operation storage line is stored with the micro-operation storage line and the N-bit relative address is compressed to generate an M-bit immediate with a J-bit field to adjust the stored instruction pointer. The M-bit immediate is stored with one or more micro-operations generated by decoder 708.

For one embodiment of immediate processing logic 711, a portion of the stored instruction pointer for the head of a micro-operation storage line is adjusted using the J-bit field and the adjusted portion is combined with the M-bit immediate to reconstruct the uncompressed N-bit relative address. The uncompressed N-bit relative address is provided to execution logic 712, which executes instruction 706 accessing the N-bit relative address.

Figure 8A:
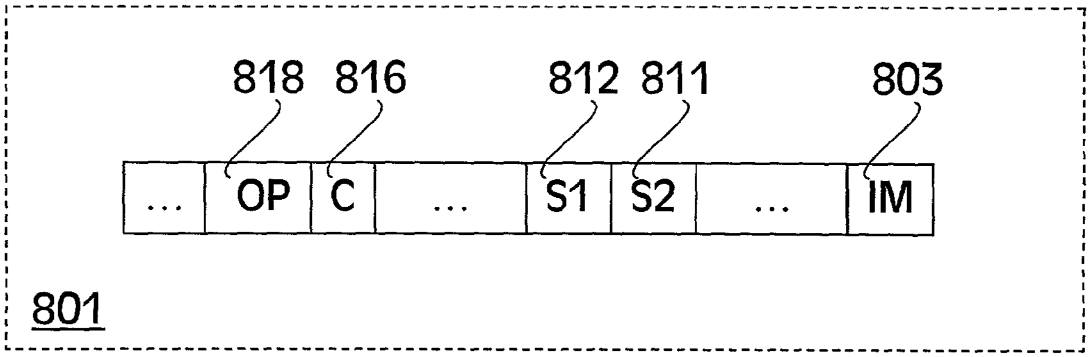
FIG. 8*a* illustrates one example of a format for storing a micro-operation.

FIG. 8*a* illustrates one example of a format 801 for storing a micro-operation. Format 801 comprises an OP 818 field to specify the micro-operation, a C 816 field to specify various control information for the micro-operation, an S1 812 field to specify a first source, an S2 811 field to specify a second source and an IM 803 field to hold immediate data. It will be appreciated that fields of a micro-operation may be continuous and uninterrupted or discontinuous and interrupted. The micro-operation storage format may also be continuous having all fields stored together in a common storage structure or discontinuous with various associated storage structures to store fields of the corresponding micro-operations. For one embodiment format 801 is similar to one described in application Ser. No. 09/223,299, titled "System and Method for Storing Immediate Data," filed Dec. 30, 1998, and assigned to Intel Corporation of Santa Clara, Calif.; now U.S. Pat. No. 6,338,132; wherein storage of immediate data may be shared with or scavenged from adjacent micr-operations in accordance with the control information specified in the C 816 field. For example, the control information may be specified in the C 816 field having a value of zero to indicate that the immediate data for the current micro-operation should be sign extended, one to indicate that a back scavenging technique is being used to store a portion of the immediate data for the current micro-operation with the previous micro-operation, two to indicate that a forward scavenging technique is being used to store a portion of the immediate data for the current micro-operation with the next micro-operation, and three to indicate that the current micro-operation shares the same immediate data stored with the previous micro-operation. For one embodiment of format 801, the IM 803 field comprises 16 bits but the invention is not so limited. For an alternative embodiment, the IM 803 field comprises 17 bits or more. It will also be appreciated that additional fields may be conveniently included in format 801.

Figure 8B:
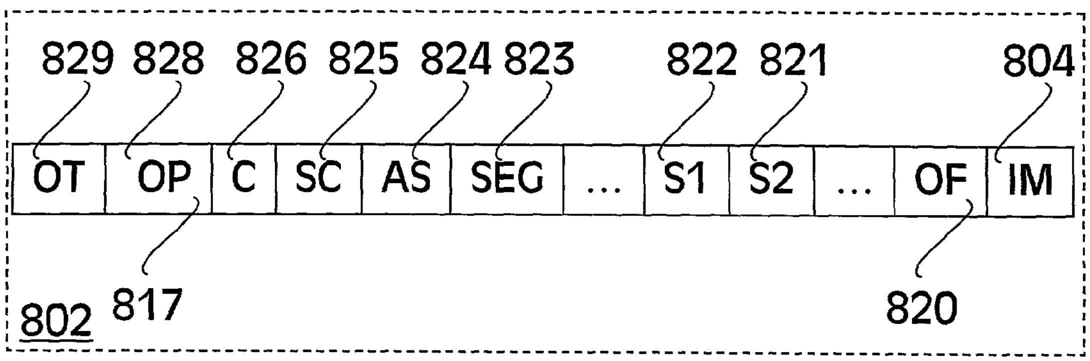
FIG. 8*b* illustrates another example of a format for storing a micro-operation.

FIG. 8*b* illustrates another, more detailed, example of a format 802 for storing a micro-operation. Format 802 comprises an OT 829 field to specify an operand type, an OP 828 field to specify the micro-operation (the OP 828 field having a least significant bit 817), a C 826 field to specify control information for the micro-operation, an SC 825 field to specify a scalar factor, an AS 824 field to specify an address size, an SEG 823 field to specify a segment, an S1 822 field to specify a first source, an S2 821 field to specify a second source, an OF 820 field to specify an overflow, and an IM 804 field to hold immediate data. For one embodiment of format 802, some fields may be used for an alternative purpose responsive to a particular micro-operation.

Figure 9:
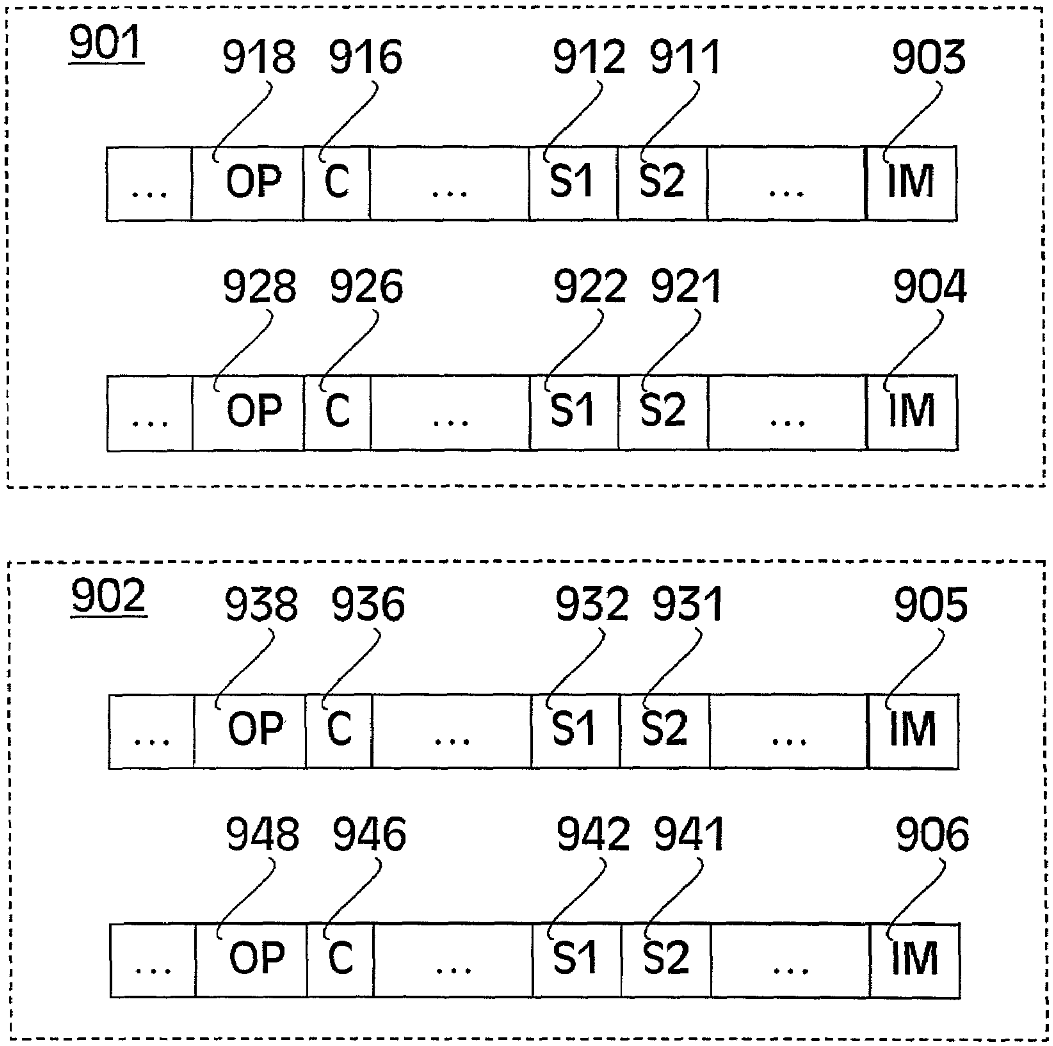
FIG. 9 illustrates one embodiment of a compressed relative address stored as immediate data according to a format for storing micro-operations.

FIG. 9 illustrates one embodiment of a compressed relative address stored as immediate data according to a format for storing micro-operations. A set of micro-operations 901 includes a first micro-operation specified in the OP 918 field or alternatively in the OP 928 field and may be associated with a first portion of immediate data held in fields IM 903 and IM 904 in accordance with the control information specified in fields C 916 and C 926. The C 926 field having a value of one, for example, indicates that back scavenging is being used to store a portion of the immediate data for the first micro-operation specified in the OP 928 field with the previous micro-operation.

A set of micro-operations 902 includes a second micro-operation specified in the OP 938 field or alternatively in the OP 948 field and may be associated with a second portion of immediate data held in fields IM 905 and IM 906 in accordance with the control information specified in fields C 936 and C 946. The C 936 field having a value of two, for example, indicates that a forward scavenging is being used to store a portion of the immediate data for the second micro-operation specified in the OP 938 field with the next micro-operation.

For one embodiment of a micro-operation storage 710, micro-operations employing techniques such as scavenging may store M-bit immediate data in M/2-bit fields, and an instruction pointer may be stored for the micro-operation at the head of the storage line. If each storage line is constructed according to a consistent set of procedures, then a decompressed relative address may be recovered from the M-bit immediate and the instruction pointer for the head of the storage line.

For example, if a storage line may hold at most six (6) micro-operations, each micro-operation having at most a 15-byte instruction delta, and at most two (2) of the micro-operations are permitted to have 32-bit signed branch displacements (i.e. a third branch begins a new storage line); then two worst case total displacement computations with respect to an instruction pointer for the head of the storage line are given (in hexadecimal) as follows:

| Head IP + | Deltas +/− | Branch disps. = | Worst case IP |
|---|---|---|---|
| 0000 FFFF FFFF + | 6*F + | 2*7FFF FFFF = | 0002 0000 0057 |
| 0002 0000 0000 + | 2*1 − | 2*8000 0000 = | 0001 0000 0002. |

From the above calculations, it will be appreciated that the higher order bits (bits 47 through 32) of the head IP may change by as much as minus one (−1) to plus two (+2) under the exemplary set of procedures for constructing a micro-operation storage line. Therefore, a 2-bit field (bits 33 and 32) of a 34-bit immediate (bits 33 through 0 of the computed relative address) may be used to adjust the instruction pointer for the head of the storage line as follows:

IP[47:32]=Head IP[47:32]+(Immediate[33:32]−Head IP[33:32])

where the difference (Immediate[33:32]−Head IP[33:32]) is interpreted as being between the values of minus one (−1) to plus two (+2), that is to say a binary value of 11 wraps to minus one (−1) instead of three (+3). The above difference operation may be performed with wrapping arithmetic according to the following table:

| HIP[33:32] ↓ | IM[33:32] → | 00 | 01 | 10 | 11 |
|---|---|---|---|---|---|
| | 00 | +0 | +1 | +2 | −1 |
| | 01 | −1 | +0 | +1 | +2 |
| | 10 | +2 | −1 | +0 | +1 |
| | 11 | +1 | +2 | −1 | +0 |

Alternatively, since the 34-bit immediate already contains the correct values for IP[33:32] the 2-bit field of the 34-bit immediate may be used to adjust only the high order 14 bits (bits 47 through 34) of the instruction pointer for the head of the storage line according to the carry or borrow generated by the difference as shown in the following table:

| HIP[33:32] ↓ | IM[33:32] → | 00 | 01 | 10 | 11 |
|---|---|---|---|---|---|
| | 00 | +0 | +0 | +0 | −1 |
| | 01 | +0 | +0 | +0 | +0 |
| | 10 | +1 | +0 | +0 | +0 |
| | 11 | +1 | +1 | +0 | +0 |

Clearly a 34-bit immediate having a 2-bit correction field is sufficient to reconstruct a 48-bit decompressed relative address from the instruction pointer for the head of the storage line under the exemplary set of procedures for constructing a micro-operation storage line. It will be appreciated that with two additional bits, the correction value itself might also be stored rather than derived according to the above tables, in which case a 36-bit immediate with a 2-bit correction field would suffice to reconstruct the 48-bit decompressed relative address. It will also be appreciated that modifications may be made to the set of procedures for constructing a micro-operation storage line resulting in any number of variations of address compression and address decompression techniques without departing from the teachings herein disclosed.

Figure 10A:
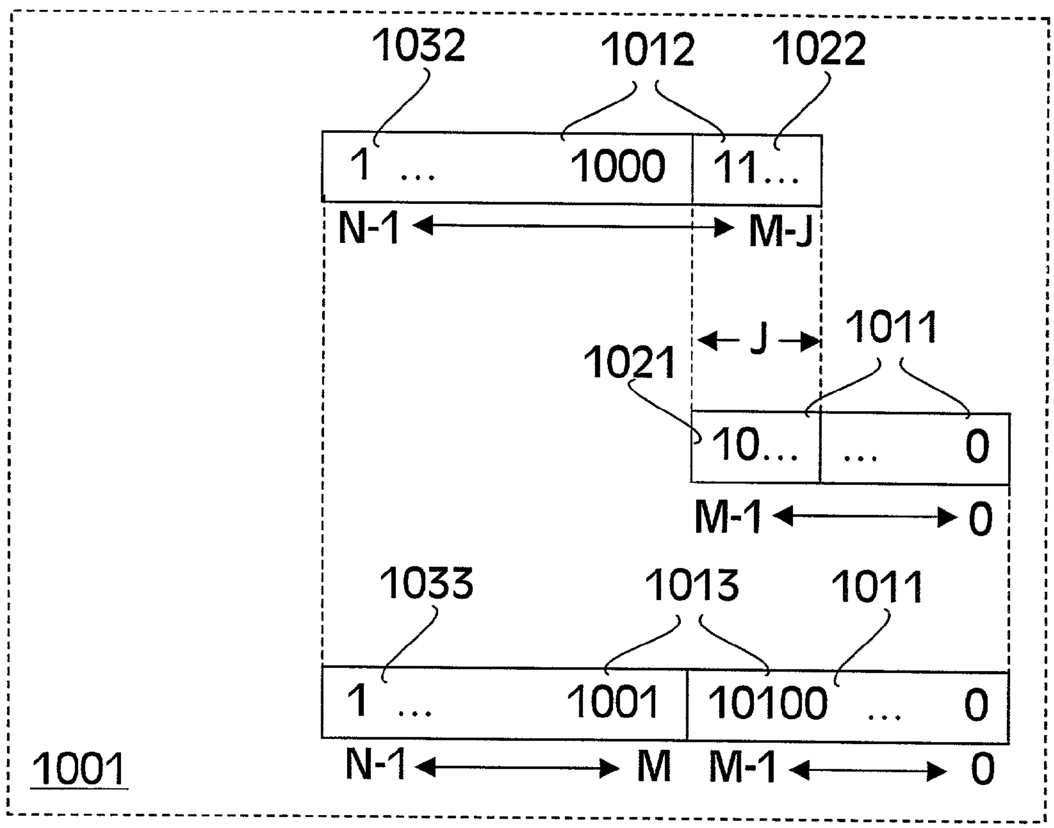
FIG. 10*a* illustrates one embodiment of a relative address decompressed from an immediate data of a micro-operation and a portion of an instruction pointer.

FIG. 10*a* illustrates one embodiment of a relative address 1013 decompressed from an immediate data 1011 of a micro-operation and a portion 1012 of an instruction pointer. The M-bit immediate data 1011 comprises a first J-bit field 1021. The portion 1012 of the instruction pointer comprises a second J-bit field 1022 and a high-order field 1032. The portion 1012 of the instruction pointer may be adjusted according to the values of the first J-bit field 1021 and the second J-bit field 1022 (for example, using an operation given by one of the above tables) to generate a new instruction pointer having a high-order field 1033. The high-order field 1033 and M-bit immediate data 1011 may be combined to decompress an N-bit relative address.

Figure 10B:
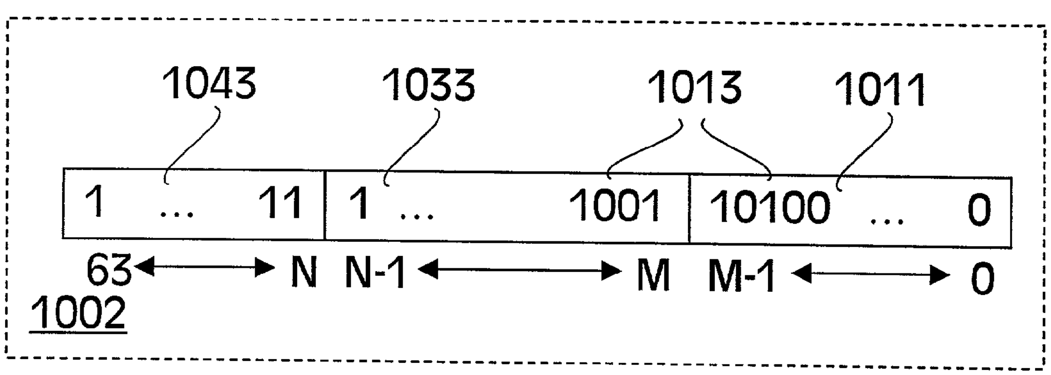
FIG. 10*b* illustrates an alternative form of the decompressed relative address illustrated in FIG. 10*a*.

FIG. 10*b* illustrates an alternative form 1002 of the decompressed relative address 1013 illustrated in FIG. 10*a*. For one embodiment of the alternative form 1002, high-order field 1033 and M-bit immediate data 1001 are combined to decompress an N-bit relative address 1013. The resulting N-bit relative address 1013 is combined with sign extension field 1043 to form a 64-bit canonical address.

Figure 11A:
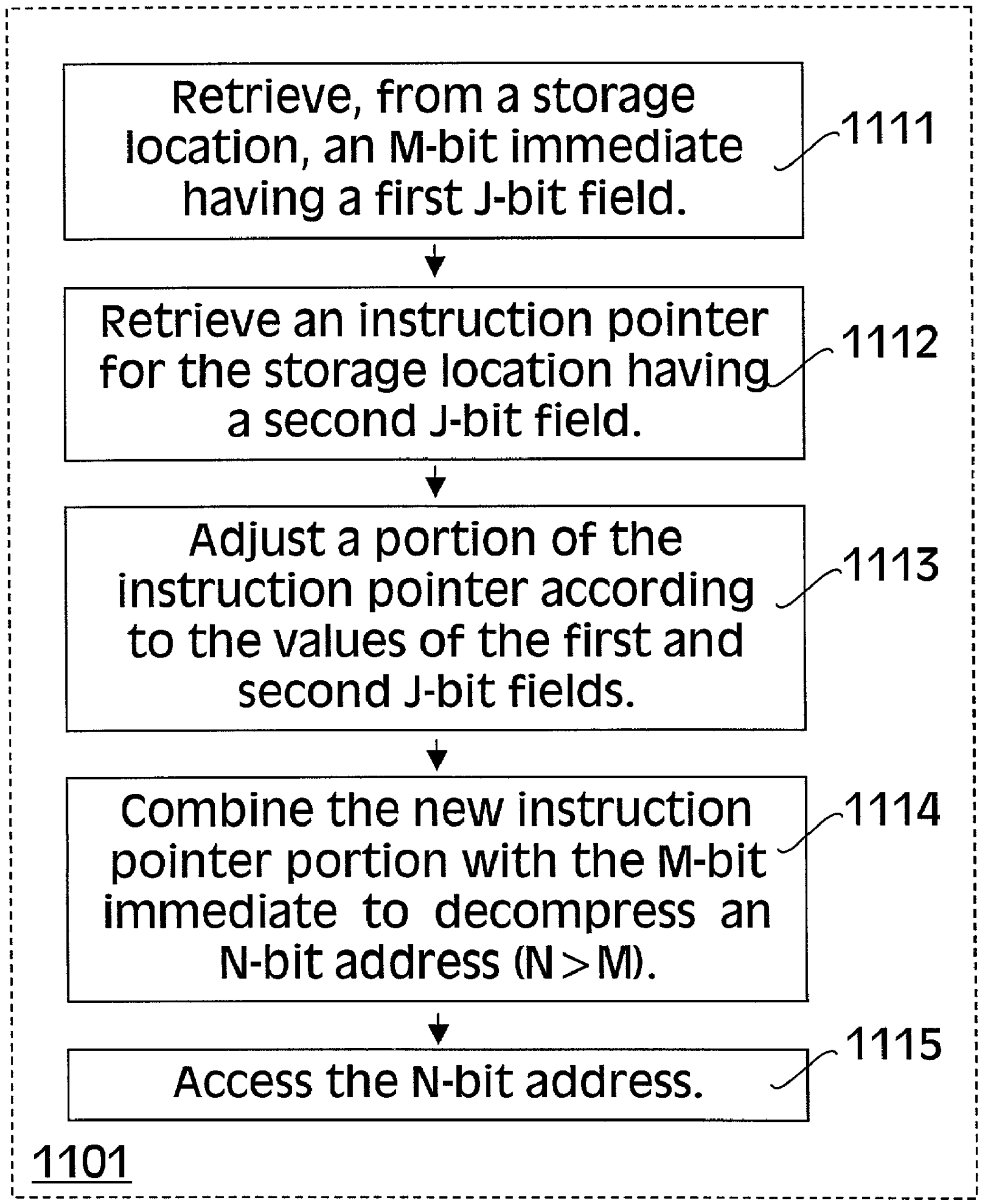
FIG. 11*a* illustrates a flow diagram for one embodiment of a process to decompress a relative address stored in a compressed form as an immediate data of a micro-operation.

FIG. 11*a* illustrates a flow diagram for one embodiment of a process 1101 to decompress a relative address stored in a compressed form as an immediate data of a micro-operation. In processing block 1111, an M-bit immediate is retrieved from a storage location, the M-bit immediate having a first J-bit field. In processing block 1112, and instruction pointer is retrieved for the storage location, the instruction pointer having a second J-bit field. Processing continues in processing block 1113 where the instruction pointer is adjusted according to the values of the first J-bit field and the second J-bit field. In processing block 1114, the new instruction pointer is combined with the M-bit immediate to decompress an N-bit address, wherein N is a larger integer value than M. Finally in processing block 1115 the N-bit address is accessed.

Figure 11B:
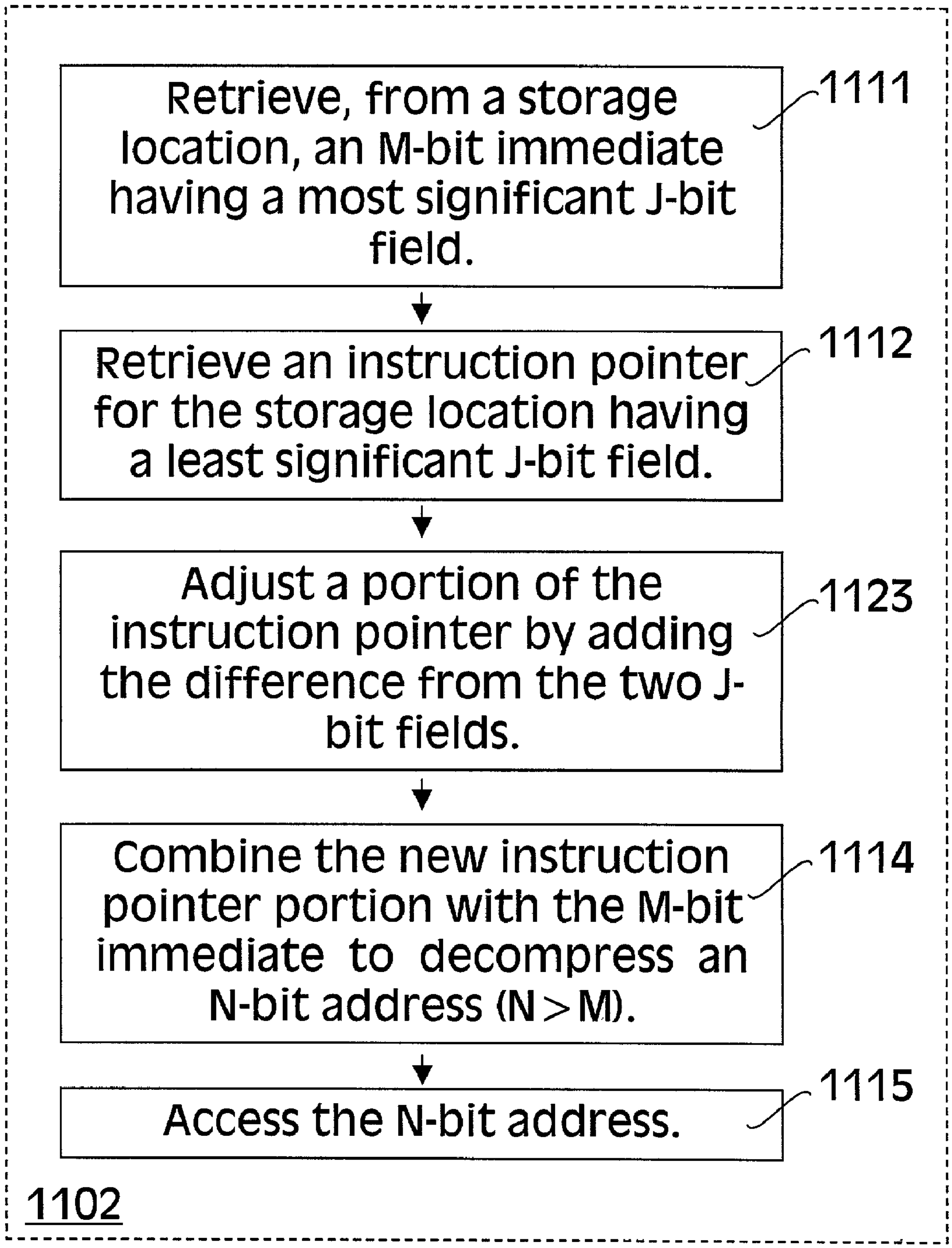
FIG. 11*b* illustrates a flow diagram for an alternative embodiment of a process to decompress a relative address stored in a compressed form as an immediate data of a micro-operation.

FIG. 11*b* illustrates a flow diagram for an alternative embodiment of a process 1102 to decompress a relative address stored in a compressed form as an immediate data of a micro-operation. Once again, an M-bit immediate having a first J-bit field is retrieved from a storage location in processing block 1111 and an instruction pointer having a second J-bit field is retrieved for the storage location in processing block 1112. Processing continues in processing block 1123 where the instruction pointer is adjusted by adding the difference from the values of the first J-bit field and the second J-bit field. In processing block 1114, the new instruction pointer is again combined with the M-bit immediate to decompress an N-bit address, and in processing block 1115 the N-bit address is accessed.

Figure 11C:
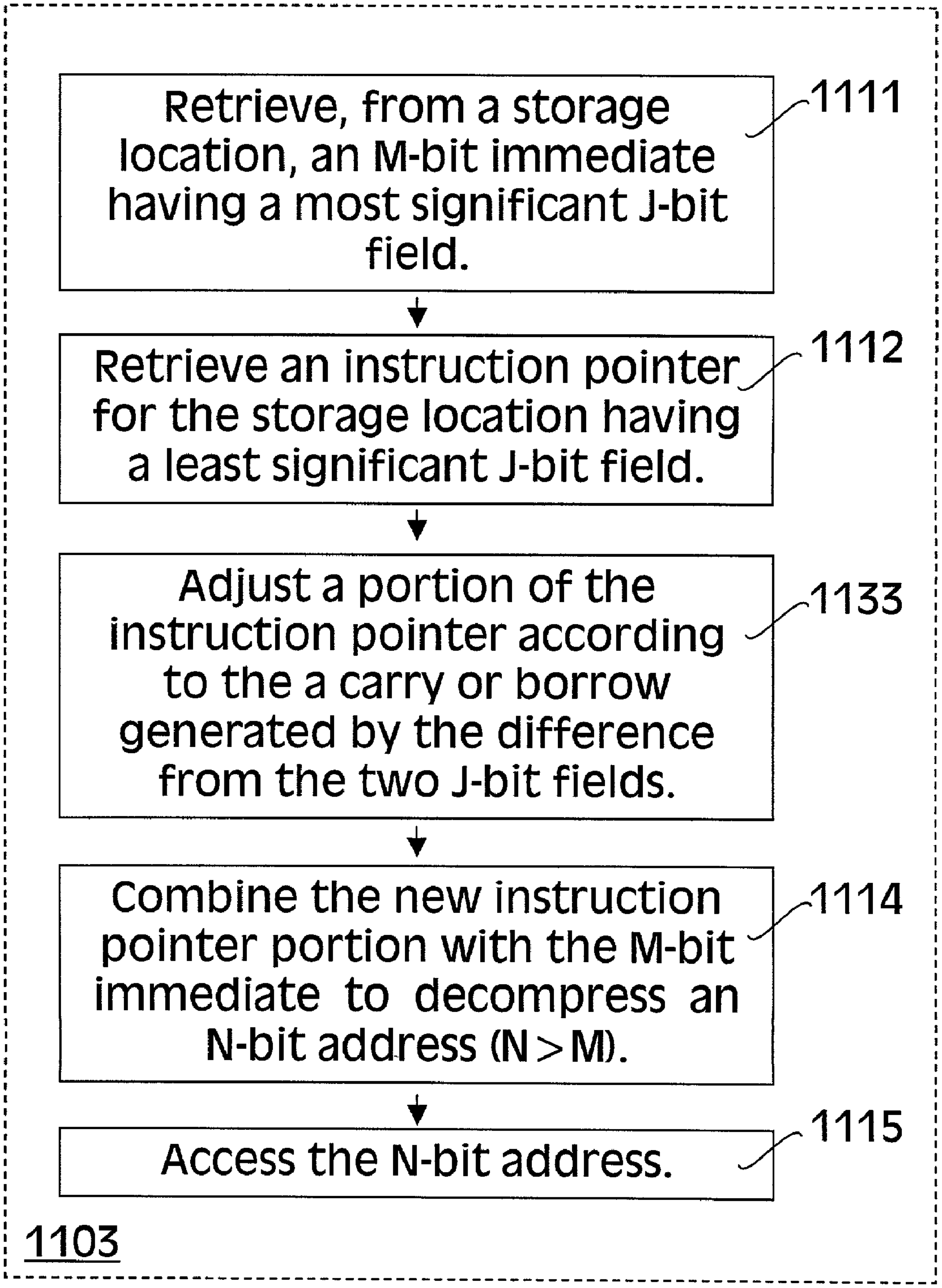
FIG. 11*c* illustrates a flow diagram for another alternative embodiment of a process to decompress a relative address stored in a compressed form as an immediate data of a micro-operation.

FIG. 11*c* illustrates a flow diagram for another alternative embodiment of a process 1103 to decompress a relative address stored in a compressed form as an immediate data of a micro-operation. As before, in processing block 1111 and in processing block 1112 an M-bit immediate having a first J-bit field is retrieved from a storage location and an instruction pointer having a second J-bit field is retrieved for the storage location. Processing continues in processing block 1133 where the instruction pointer is adjusted according to the carry or borrow generated by the difference from the values of the first J-bit field and the second J-bit field. Then again, the new instruction pointer is combined with the M-bit immediate to decompress an N-bit address in processing block 1114, and the N-bit address is accessed in processing block 1115.

Figure 11D:
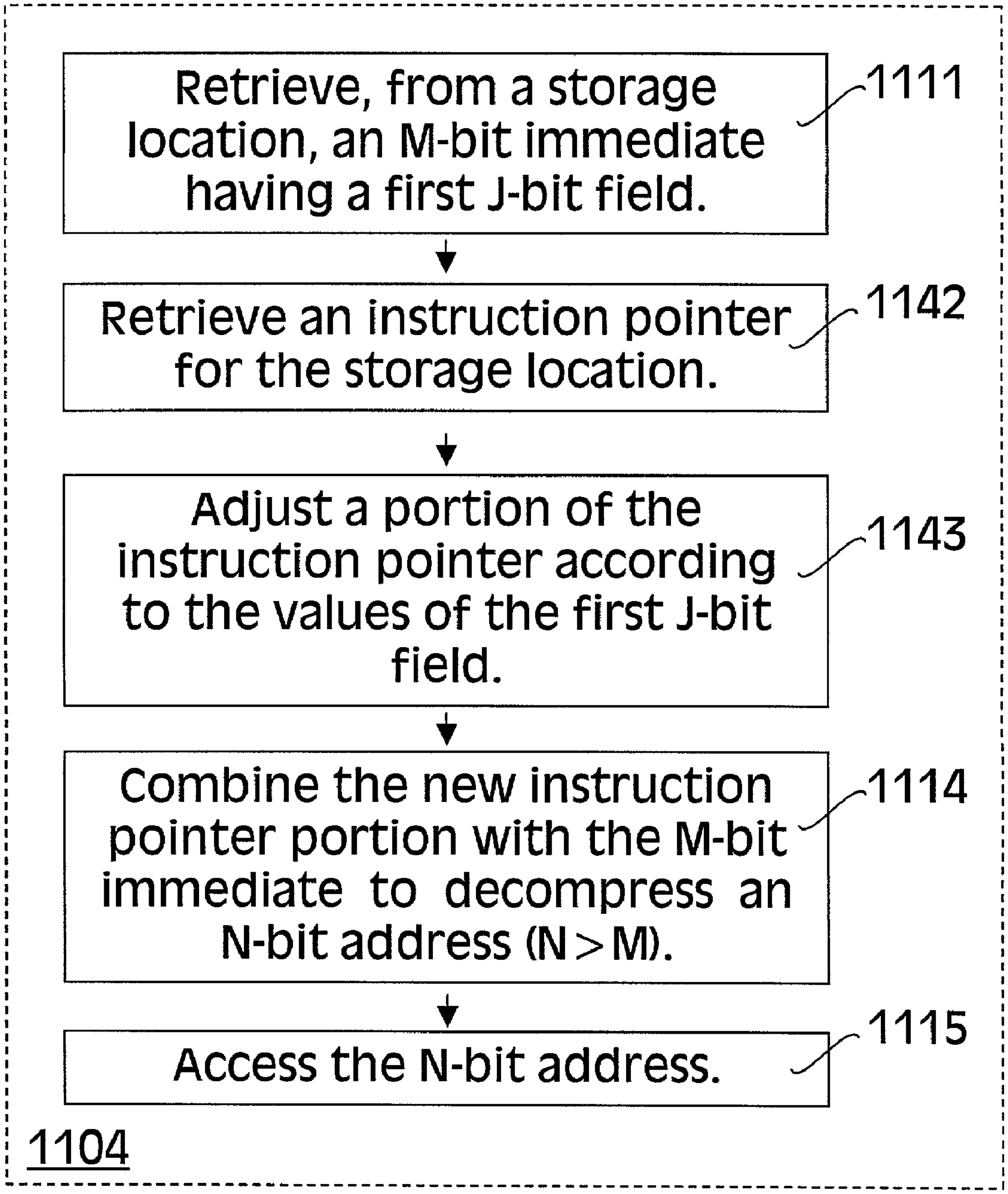
FIG. 11*d* illustrates a flow diagram for another alternative embodiment of a process to decompress a relative address stored in a compressed form as an immediate data of a micro-operation.

FIG. 11*d* illustrates a flow diagram for another alternative embodiment of a process 1104 to decompress a relative address stored in a compressed form as an immediate data of a micro-operation. As before, in processing block 1111 an M-bit immediate having a first J-bit field is retrieved from a storage location. In processing block 1142, an instruction pointer is retrieved for the storage location. In processing block 1143 the instruction pointer is adjusted according to the first J-bit field. Then, as before, the new instruction pointer is combined with the M-bit immediate to decompress an N-bit address in processing block 1114, and the N-bit address is accessed in processing block 1115.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. An apparatus comprising:

a storage medium having a first location to store at least a first micro-operation and an M-bit representation of an N-bit address, M being less than N, the M-bit representation having a first J-bit field; and decompression logic coupled with said storage medium to access the M-bit representation of the N-bit address and to reconstruct the N-bit address by combining at least a first portion of an instruction pointer address for the first location and the M-bit representation of the N-bit address, wherein said combining comprises adjusting the first portion of the instruction pointer address according to the value of the first J-bit field and the value of a second J-bit field of the instruction pointer address by adding a difference from the first J-bit field and the second J-bit field to the first portion of the instruction pointer address.

2. The apparatus of claim 1 further comprising:

execution logic coupled with the decompression logic to execute the first micro-operation to access a memory location indicated by the reconstructed N-bit address.

3. The apparatus of claim 2 further comprising:

fill logic coupled with the storage medium to store the M-bit representation of the N-bit address in one or more entries of the first location associated with the first micro-operation wherein one of the one or more entries associated with the first micro-operation is scavenged from a second micro operation.

4. The apparatus of claim 1 wherein combining at least the first portion of the instruction pointer address for the first location and the M-bit representation of the N-bit address comprises adjusting the first portion of the instruction pointer address according to the value of the first J-bit field.

5. The apparatus of claim 4 wherein M is equal to 34.

6. The apparatus of claim 5 wherein J is at least 2.

7. An apparatus comprising:

a storage medium having a first location to store at least a first micro-operation and an M-bit representation of an N-bit address, M being less than N, the M-bit representation having a first J-bit field; and decompression logic coupled with said storage medium to access the M-bit representation of the N-bit address and to reconstruct the N-bit address by combining at least a first portion of an instruction pointer address for the first location and the M-bit representation of the N-bit address, wherein said combining comprises adjusting the first portion of the instruction pointer address according to the value of the first J-bit field and the value of a second J-bit field of the instruction pointer address and wherein the first portion of the instruction pointer address is adjusted according to the value of a carry or borrow of a difference from the first J-bit field and the second J-bit field.

8. The apparatus of claim 7 wherein N-M is at least 14.

9. The apparatus of claim 8 wherein N is at least 48.

10. The apparatus of claim 9 wherein combining at least the first portion of the instruction pointer address for the first location and the M-bit representation of the N-bit address comprises adjusting the first portion of the instruction pointer address according to the value of the first J-bit field.

11. The apparatus of claim 7 wherein M is equal to 34.

12. The apparatus of claim 11 wherein J is at least 2.

13. An apparatus comprising:

a storage medium having a storage location to store a compact representation of a relative address computed with respect to a first instruction pointer address, and to associate with a second instruction pointer address different from the first instruction pointer address;

decompression logic coupled with the storage medium to access the storage location and to reconstruct the relative address from the compact representation and a portion of the second instruction pointer address.

14. The apparatus of claim 13 further comprising a decoder to decode an instruction at a third instruction pointer address different from the first instruction pointer address, the instruction having a displacement to specify the relative address with respect to the first instruction pointer address.

15. The apparatus of claim 14 wherein the first instruction pointer address is sequentially after the instruction at the third instruction pointer address.

16. The apparatus of claim 14 wherein an instruction at the second instruction pointer address is before the instruction at the third instruction pointer address in a sequential execution order when the second and third instruction pointer addresses are different.

17. The apparatus of claim 13 wherein the compact representation comprises 34 bits of the relative address.

18. The apparatus of claim 17 wherein the relative address is at least 48 bits.

19. The apparatus of claim 13 wherein reconstruction of the relative address from the compact representation and the portion of the second instruction pointer address comprises adjusting the portion of the second instruction pointer address according to the values of a first field of most significant bits of the compact representation.

20. The apparatus of claim 19 wherein the portion of the second instruction pointer address is also adjusted according to the values of a second field of bits of the second instruction pointer address.

21. The apparatus of claim 19 wherein both the first and second fields comprise 2 bits.

22. An apparatus comprising:

a storage medium having a storage location to store a compact representation of a relative address computed with respect to a first instruction pointer address, and to associate with a second instruction pointer address different from the first instruction pointer address;

decompression logic coupled with the storage medium to access the storage location and to reconstruct the relative address from the compact representation and a portion of the second instruction pointer address, wherein said reconstruction comprises adjusting the portion of the second instruction pointer address according to the values of a first field of most significant bits of the compact representation and a second field of bits of the second instruction pointer address by adding a difference from the first field and the second field to the portion of the second instruction pointer address.

23. The apparatus of claim 22 further comprising a decoder to decode an instruction at a third instruction pointer address different from the first instruction pointer address, the instruction having a displacement to specify the relative address with respect to the first instruction pointer address.

24. The apparatus of claim 23 wherein the first instruction pointer address is sequentially after the instruction at the third instruction pointer address.

25. The apparatus of claim 23 wherein an instruction at the second instruction pointer address is before the instruction at the third instruction pointer address in a sequential execution order when the second and third instruction pointer addresses are different.

26. The apparatus of claim 22 wherein the compact representation comprises 34 bits of the relative address.

27. The apparatus of claim 26 wherein the relative address is at least 48 bits.

28. An apparatus comprising:

a storage medium having a storage location to store a compact representation of a relative address computed with respect to a first instruction pointer address, and to associate with a second instruction pointer address different from the first instruction pointer address;

decompression logic coupled with the storage medium to access the storage location and to reconstruct the relative address from the compact representation and a portion of the second instruction pointer address, wherein said reconstruction comprises adjusting the portion of the second instruction pointer address according to the values of a first field of most significant bits of the compact representation and a second field of bits of the second instruction pointer address and wherein the portion of the second instruction pointer address is adjusted according to the value of a carry or borrow of a difference from the first field and the second field.

29. The apparatus of claim 28 wherein the portion of the second instruction pointer address is also adjusted according to the values of a second field of bits of the second instruction pointer address.

30. The apparatus of claim 28 wherein both the first and second fields comprise 2 bits.

31. A computing system comprising:

an addressable memory to store data;

a magnetic storage device to hold software, the software configured to supply a first instruction having a relative addressing mode to the addressable memory for execution; and a processor including:

a decoder to decode the first instruction into at least a first micro-operation;

a micro-operation storage having a storage location to store the first micro-operation and a compact representation of a relative address computed with respect to a first instruction pointer address, the micro-operation storage to associate with the storage location a second instruction pointer address different from the first instruction pointer address;

decompression logic coupled with the micro-operation storage to access the storage location and to reconstruct the relative address from the compact representation and a portion of the second instruction pointer address, and memory access logic to access data stored by the addressable memory at the location indicated by the reconstructed relative address.

32. The computing system of claim 31, the first instruction fetched by the processor from the addressable memory at a third instruction pointer address different from the first instruction pointer address, the first instruction having a displacement to specify the relative address with respect to the first instruction pointer address.

33. The computing system of claim 32 wherein the first instruction pointer address is sequentially after the first instruction in the addressable memory.

34. The apparatus of claim 33 wherein a second instruction at the second instruction pointer address is before the first instruction in a sequential execution order when the second and third instruction pointer addresses are different.

* * * * *